(12) United States Patent
Nielsen et al.

(10) Patent No.: US 9,124,780 B2
(45) Date of Patent: Sep. 1, 2015

(54) METHODS AND APPARATUS FOR TRACKING MOTION AND/OR ORIENTATION OF A MARKING DEVICE

(75) Inventors: Steven Nielsen, North Palm Beach, FL (US); Curtis Chambers, Palm Beach Gardens, FL (US); Jeffrey Farr, Jupiter, FL (US); Jack M. Vice, Stafford, VA (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 522 days.

(21) Appl. No.: 13/236,162

(22) Filed: Sep. 19, 2011

(65) Prior Publication Data

US 2012/0069178 A1  Mar. 22, 2012

Related U.S. Application Data

(60) Provisional application No. 61/384,158, filed on Sep. 17, 2010, provisional application No. 61/451,007, filed on Mar. 9, 2011.

(51) Int. Cl.
| | |
|---|---|
| *H04N 7/18* | (2006.01) |
| *H04N 5/232* | (2006.01) |
| *B65D 83/20* | (2006.01) |
| *G06Q 10/08* | (2012.01) |
| *B05B 12/08* | (2006.01) |

(52) U.S. Cl.
CPC ............ *H04N 7/183* (2013.01); *B65D 83/203* (2013.01); *G06Q 10/0833* (2013.01); *B05B 12/084* (2013.01)

(58) Field of Classification Search
None
See application file for complete search history.

(56) References Cited

U.S. PATENT DOCUMENTS

| | | | |
|---|---|---|---|
| 5,025,150 A | 6/1991 | Oldham et al. | |
| 5,257,195 A | 10/1993 | Hirata | |
| 5,517,419 A | 5/1996 | Lanckton | |
| 5,621,325 A | 4/1997 | Draper et al. | |

(Continued)

FOREIGN PATENT DOCUMENTS

| | | |
|---|---|---|
| EP | 0609935 | 8/1994 |
| EP | 2112630 | 10/2009 |
| WO | WO03021044 | 3/2003 |

OTHER PUBLICATIONS

Beauregard, "A Helmet-Mounted Pedestrian Dead Reckoning System," IFAWC 2006, Mar. 15-16, Mobile Research Center, Tzi Universitat Breman, Germany, 11 pages.

(Continued)

*Primary Examiner* — Gims Philippe
*Assistant Examiner* — Samuel D Fereja

(57) ABSTRACT

Marking material is dispensed onto a target surface using a marking device, and one or more images are captured by one or more camera systems attached to the marking device. The image(s) is/are analyzed to determine tracking information indicative of the a motion or an orientation of the marking device. The tracking information is analyzed to determine marking information relating to the dispensed marking material. In one example, the image(s) is/are analyzed to obtain an optical flow plot indicative of a path on the target surface traversed by the marking device. One or more reference plots respectively representing a plurality of reference marking patterns are compared to one or more portions of the optical flow plot to identify at least one reference marking pattern that substantially matches the portion(s) of the optical flow plot.

40 Claims, 21 Drawing Sheets

(56) References Cited

U.S. PATENT DOCUMENTS

| | | |
|---|---|---|
| 5,742,509 A | 4/1998 | Goldberg et al. |
| 5,751,450 A | 5/1998 | Robinson |
| 6,026,135 A | 2/2000 | McFee et al. |
| 6,074,693 A | 6/2000 | Manning |
| 6,083,353 A | 7/2000 | Alexander, Jr. |
| 6,119,621 A | 9/2000 | Johnson |
| 6,138,906 A | 10/2000 | DeMayo |
| 6,157,320 A | 12/2000 | Yujiri et al. |
| 6,299,934 B1 | 10/2001 | Manning |
| 6,327,533 B1 | 12/2001 | Chou |
| 6,330,503 B1 | 12/2001 | Sharp |
| 6,362,778 B2 | 3/2002 | Neher |
| 6,414,629 B1 | 7/2002 | Curcio |
| 6,429,790 B1 | 8/2002 | Frese |
| 6,502,033 B1 | 12/2002 | Phuyal |
| 6,536,553 B1 | 3/2003 | Scanlon |
| 6,665,432 B1 | 12/2003 | Evans et al. |
| 6,693,585 B1 | 2/2004 | MacLeod |
| 6,750,816 B1 | 6/2004 | Kunysz |
| 6,876,945 B2 | 4/2005 | Emord |
| 6,944,542 B1 | 9/2005 | Eschenbach |
| 6,972,719 B1 | 12/2005 | Swope |
| 6,978,037 B1 * | 12/2005 | Fechner et al. ............... 382/103 |
| 7,057,383 B2 | 6/2006 | Schlapp et al. |
| 7,091,852 B2 | 8/2006 | Mason et al. |
| 7,113,124 B2 | 9/2006 | Waite |
| 7,120,564 B2 | 10/2006 | Pacey |
| 7,123,152 B2 | 10/2006 | Contractor |
| 7,143,130 B2 | 11/2006 | Lin |
| 7,150,276 B1 | 12/2006 | Rice |
| 7,162,367 B2 | 1/2007 | Lin et al. |
| 7,236,091 B2 | 6/2007 | Kiang et al. |
| 7,245,215 B2 | 7/2007 | Gollu |
| 7,246,031 B2 | 7/2007 | Boudreaux |
| 7,298,323 B2 | 11/2007 | Park |
| 7,356,421 B2 | 4/2008 | Gudmundsson et al. |
| 7,379,015 B2 | 5/2008 | Workman |
| 7,383,129 B1 | 6/2008 | Baillot et al. |
| 7,400,246 B2 | 7/2008 | Breeding |
| 7,403,853 B1 | 7/2008 | Janky et al. |
| 7,443,154 B1 | 10/2008 | Merewether et al. |
| 7,538,688 B1 | 5/2009 | Stewart |
| 7,538,724 B1 * | 5/2009 | Baillot .................... 342/357.31 |
| 7,541,974 B2 | 6/2009 | Scherzinger |
| 7,640,105 B2 | 12/2009 | Nielsen et al. |
| 8,060,304 B2 | 11/2011 | Nielsen et al. |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,473,148 B2 | 6/2013 | Nielsen et al. |
| 8,473,207 B2 | 6/2013 | Roh |
| 8,480,332 B2 | 7/2013 | Miller |
| 8,532,341 B2 | 9/2013 | Nielsen et al. |
| 8,543,937 B2 | 9/2013 | Nielsen et al. |
| 8,577,707 B2 | 11/2013 | Nielsen et al. |
| 8,589,201 B2 | 11/2013 | Nielsen et al. |
| 8,589,202 B2 | 11/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,626,571 B2 | 1/2014 | Nielsen et al. |
| 8,630,463 B2 | 1/2014 | Nielsen et al. |
| 8,700,325 B2 | 4/2014 | Nielsen et al. |
| 8,775,077 B2 | 7/2014 | Nielsen et al. |
| 8,830,265 B2 | 9/2014 | Nielsen et al. |
| 8,903,643 B2 | 12/2014 | Nielsen et al. |
| 2002/0122115 A1 | 9/2002 | Harmath |
| 2003/0130820 A1 | 7/2003 | Lane, III |
| 2004/0210370 A1 | 10/2004 | Gudat |
| 2006/0013480 A1 * | 1/2006 | Sano ............................ 382/168 |
| 2006/0037528 A1 | 2/2006 | Farritor |
| 2006/0055584 A1 | 3/2006 | Waite et al. |
| 2006/0125644 A1 | 6/2006 | Sharp |
| 2006/0188131 A1 | 8/2006 | Zhang et al. |
| 2006/0282280 A1 | 12/2006 | Stotz et al. |
| 2007/0189374 A1 | 8/2007 | Comparsi De Castro et al. |
| 2007/0191025 A1 | 8/2007 | McBrierty et al. |
| 2007/0222640 A1 | 9/2007 | Guelzow, II |
| 2007/0285217 A1 | 12/2007 | Ishikawa et al. |
| 2008/0125970 A1 | 5/2008 | Scheckler |
| 2008/0140256 A1 | 6/2008 | Nishiyama |
| 2008/0186166 A1 | 8/2008 | Zhou et al. |
| 2008/0234902 A1 | 9/2008 | Johnson et al. |
| 2008/0258590 A1 | 10/2008 | Van De Sluis et al. |
| 2008/0285848 A1 | 11/2008 | Meyer et al. |
| 2008/0310721 A1 | 12/2008 | Yang |
| 2009/0012448 A1 | 1/2009 | Childers et al. |
| 2009/0021514 A1 | 1/2009 | Klusza |
| 2009/0043504 A1 * | 2/2009 | Bandyopadhyay et al. .. 701/213 |
| 2009/0073034 A1 | 3/2009 | Lin |
| 2009/0128156 A1 | 5/2009 | Li et al. |
| 2009/0128407 A1 | 5/2009 | Xie et al. |
| 2009/0157746 A1 | 6/2009 | More et al. |
| 2009/0184823 A1 | 7/2009 | Tessier |
| 2009/0201311 A1 | 8/2009 | Nielsen et al. |
| 2009/0202101 A1 | 8/2009 | Nielsen et al. |
| 2009/0202111 A1 | 8/2009 | Nielsen et al. |
| 2009/0202112 A1 * | 8/2009 | Nielsen et al. ................ 382/113 |
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0233573 A1 | 9/2009 | Gray |
| 2009/0238415 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0103266 A1 | 4/2010 | Merkel et al. |
| 2010/0117654 A1 | 5/2010 | Nielsen et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |

(56) References Cited

U.S. PATENT DOCUMENTS

| | | | |
|---|---|---|---|
| 2010/0188407 A1 | 7/2010 | Nielsen et al. | |
| 2010/0189312 A1 | 7/2010 | Nielsen et al. | |
| 2010/0189887 A1 | 7/2010 | Nielsen et al. | |
| 2010/0198663 A1 | 8/2010 | Nielsen et al. | |
| 2010/0201690 A1 | 8/2010 | Nielsen et al. | |
| 2010/0203933 A1 | 8/2010 | Eyzaguirre et al. | |
| 2010/0205031 A1 | 8/2010 | Nielsen et al. | |
| 2010/0205032 A1 | 8/2010 | Nielsen et al. | |
| 2010/0205264 A1 | 8/2010 | Nielsen et al. | |
| 2010/0205536 A1 | 8/2010 | Nielsen et al. | |
| 2010/0205554 A1 | 8/2010 | Nielsen et al. | |
| 2010/0228588 A1 | 9/2010 | Nielsen et al. | |
| 2010/0245086 A1 | 9/2010 | Nielsen et al. | |
| 2010/0247754 A1 | 9/2010 | Nielsen et al. | |
| 2010/0253511 A1 | 10/2010 | Nielsen et al. | |
| 2010/0253513 A1 | 10/2010 | Nielsen et al. | |
| 2010/0253514 A1 | 10/2010 | Nielsen et al. | |
| 2010/0255182 A1 | 10/2010 | Nielsen et al. | |
| 2010/0256825 A1 | 10/2010 | Nielsen et al. | |
| 2010/0256912 A1 | 10/2010 | Nielsen et al. | |
| 2010/0256981 A1 | 10/2010 | Nielsen et al. | |
| 2010/0257029 A1 | 10/2010 | Nielsen et al. | |
| 2010/0257477 A1 | 10/2010 | Nielsen et al. | |
| 2010/0259381 A1 | 10/2010 | Nielsen et al. | |
| 2010/0259414 A1 | 10/2010 | Nielsen et al. | |
| 2010/0259609 A1* | 10/2010 | Takahashi | 348/135 |
| 2010/0262470 A1 | 10/2010 | Nielsen et al. | |
| 2010/0262670 A1 | 10/2010 | Nielsen et al. | |
| 2010/0263591 A1 | 10/2010 | Nielsen et al. | |
| 2010/0285211 A1 | 11/2010 | Nielsen et al. | |
| 2010/0318401 A1 | 12/2010 | Nielsen et al. | |
| 2010/0318402 A1 | 12/2010 | Nielsen et al. | |
| 2010/0318465 A1 | 12/2010 | Nielsen et al. | |
| 2010/0324967 A1 | 12/2010 | Nielsen et al. | |
| 2011/0007076 A1 | 1/2011 | Nielsen et al. | |
| 2011/0019027 A1* | 1/2011 | Fujita et al. | 348/222.1 |
| 2011/0020776 A1 | 1/2011 | Nielsen et al. | |
| 2011/0022433 A1 | 1/2011 | Nielsen et al. | |
| 2011/0035245 A1 | 2/2011 | Nielsen et al. | |
| 2011/0035251 A1 | 2/2011 | Nielsen et al. | |
| 2011/0035252 A1 | 2/2011 | Nielsen et al. | |
| 2011/0035260 A1 | 2/2011 | Nielsen et al. | |
| 2011/0035324 A1 | 2/2011 | Nielsen et al. | |
| 2011/0035328 A1 | 2/2011 | Nielsen et al. | |
| 2011/0040589 A1 | 2/2011 | Nielsen et al. | |
| 2011/0040590 A1 | 2/2011 | Nielsen et al. | |
| 2011/0045175 A1 | 2/2011 | Nielsen et al. | |
| 2011/0046993 A1 | 2/2011 | Nielsen et al. | |
| 2011/0046994 A1 | 2/2011 | Nielsen et al. | |
| 2011/0046999 A1 | 2/2011 | Nielsen et al. | |
| 2011/0060496 A1 | 3/2011 | Nielsen et al. | |
| 2011/0060549 A1 | 3/2011 | Nielsen et al. | |
| 2011/0093162 A1 | 4/2011 | Nielsen et al. | |
| 2011/0093304 A1 | 4/2011 | Nielsen et al. | |
| 2011/0093306 A1 | 4/2011 | Nielsen et al. | |
| 2011/0095885 A9 | 4/2011 | Nielsen et al. | |
| 2011/0117272 A1 | 5/2011 | Nielsen et al. | |
| 2011/0131081 A1 | 6/2011 | Nielsen et al. | |
| 2011/0137769 A1 | 6/2011 | Nielsen et al. | |
| 2011/0181872 A1* | 7/2011 | Dold et al. | 356/139.04 |
| 2011/0199461 A1* | 8/2011 | Horio et al. | 348/46 |
| 2011/0202204 A1 | 8/2011 | Kahn | |
| 2011/0216188 A1* | 9/2011 | Thwing et al. | 348/135 |
| 2011/0236588 A1 | 9/2011 | Nielsen et al. | |
| 2011/0249394 A1 | 10/2011 | Nielsen et al. | |
| 2011/0279229 A1 | 11/2011 | Nielsen et al. | |
| 2011/0279230 A1 | 11/2011 | Nielsen et al. | |
| 2011/0279476 A1 | 11/2011 | Nielsen et al. | |
| 2011/0283217 A1 | 11/2011 | Nielsen et al. | |
| 2011/0285749 A1 | 11/2011 | Nielsen et al. | |
| 2011/0304737 A1* | 12/2011 | Evans et al. | 348/169 |
| 2012/0019380 A1 | 1/2012 | Nielsen et al. | |
| 2012/0020571 A1 | 1/2012 | Schultz et al. | |
| 2012/0036140 A1 | 2/2012 | Nielsen et al. | |
| 2012/0065924 A1 | 3/2012 | Nielsen et al. | |
| 2012/0065944 A1 | 3/2012 | Nielsen et al. | |
| 2012/0066137 A1 | 3/2012 | Nielsen et al. | |
| 2012/0066273 A1 | 3/2012 | Nielsen et al. | |
| 2012/0066506 A1 | 3/2012 | Nielsen et al. | |
| 2012/0069178 A1 | 3/2012 | Nielsen et al. | |
| 2012/0072035 A1 | 3/2012 | Nielsen et al. | |
| 2012/0110019 A1 | 5/2012 | Nielsen et al. | |
| 2012/0113244 A1 | 5/2012 | Nielsen et al. | |
| 2012/0249368 A1 | 10/2012 | Youssef et al. | |
| 2012/0274476 A1 | 11/2012 | Nielsen et al. | |
| 2012/0328162 A1 | 12/2012 | Nielsen et al. | |
| 2012/0330849 A1 | 12/2012 | Nielsen et al. | |
| 2013/0002854 A1 | 1/2013 | Nielsen et al. | |
| 2013/0006718 A1 | 1/2013 | Nielsen et al. | |
| 2013/0044918 A1 | 2/2013 | Nielsen et al. | |
| 2013/0085670 A1 | 4/2013 | Nielsen et al. | |
| 2013/0088389 A1 | 4/2013 | Yamada | |
| 2013/0103318 A1 | 4/2013 | Nielsen et al. | |
| 2013/0135343 A1 | 5/2013 | Nielsen et al. | |
| 2013/0147637 A1 | 6/2013 | Nielsen et al. | |
| 2013/0174072 A9 | 7/2013 | Nielsen et al. | |
| 2013/0186333 A1 | 7/2013 | Nielsen et al. | |
| 2013/0194303 A1 | 8/2013 | Nielsen et al. | |
| 2013/0231984 A1 | 9/2013 | Nielsen et al. | |
| 2013/0233883 A1 | 9/2013 | Nielsen et al. | |
| 2013/0251894 A1 | 9/2013 | Nielsen et al. | |
| 2013/0265138 A1 | 10/2013 | Nielsen et al. | |
| 2013/0268199 A1 | 10/2013 | Nielsen et al. | |
| 2013/0287500 A1 | 10/2013 | Miller | |
| 2013/0315449 A1 | 11/2013 | Nielsen et al. | |
| 2014/0022272 A1 | 1/2014 | Nielsen et al. | |
| 2014/0035587 A1 | 2/2014 | Nielsen et al. | |
| 2014/0074970 A1 | 3/2014 | Nielsen et al. | |
| 2014/0122149 A1 | 5/2014 | Nielsen et al. | |
| 2014/0278661 A1 | 9/2014 | Nielsen et al. | |
| 2014/0304041 A1 | 10/2014 | Nielsen et al. | |
| 2014/0321717 A1 | 10/2014 | Nielsen et al. | |
| 2014/0334878 A1 | 11/2014 | Miller | |
| 2014/0347396 A1 | 11/2014 | Nielsen et al. | |

OTHER PUBLICATIONS

Carbonari et al., A Proactive System for Real-time Safety Management in Construction Sites, 26th International Symposium on Automation and Robotics in Construction (ISARC 2009), pp. 47-54.

Chae et al., "A Location System with RFID Technology in Building Construction Site," 22nd International Symposium on Automation and Robotics in Construction (ISARC 2005), pp. 1-6.

Chae et al., An Estimating Method of Worker's Task with 6-DOF Sensors, 21st International Symposium on Automation and Robotics in Construction (ISARC 2004), 6 pages.

Clark et al., "Analysis of Improvement to Two-Wheel Robot Navigation Using Low-Cost GPS/IBS Aids," Proceedings of the Institute of Navigation, 19th International Technical Meeting of the Satellite Division, Dec. 1, 2006, 9 pages.

El-Omari et al., "Integrating Automated Data Acquisition Technologies for Progress Reporting of Construction Projects," 26th International Symposium on Automation and Robotics in Construction (ISARC 2009), pp. 86-94.

Fang et al., "Design of a Wireless Assisted Pedestrian Dead Reckoning System—The NavMote Experience," IEEE Transactions on Instrumentation and Measurement. vol. 54, No. 6, 2005, pp. 1-16.

Fang, L. et al., "Design of a Wireless Assisted Pedestrian Dead Reckoning System—The NAVMote Experience," Dec. 2005, IEEE Transactions on Instrumentation and Measurement.

Fumio et al., "Development of Digital Photo System Using RFID Technology in Plant Construction Management," 26th International Symposium on Automation and Robotics in Construction (ISARC 2009), pp. 68-75.

Giretti et al., "Advanced Real-Time Safety Management System for Construction Sites," The 25th International Symposium on Automation and Robotics in Construction, Jun. 26-28, 2008, pp. 300-305.

Griffin, "Emerging Technologies for Transportation Construction," Transportation in the New Millenium, 2000, 7 pages.

International Search Report and Written Opinion, Application No. PCT/US11/51616, dated Jan. 31, 2012.

(56) References Cited

OTHER PUBLICATIONS

International Search Report and Written Opinion, Application No. PCT/US2011/047805, Dec. 14, 2011.
International Search Report and Written Opinion, Application No. PCT/US2011/047807, Dec. 6, 2011.
International Search Report and Written Opinion, Application No. PCT/US2012/36198, Oct. 22, 2012.
International Search Report, Application No. PCT/US2011/052132, Jan. 17, 2012.
Jackson, J.D. et al., "A Method for Relative Position Tracking of Vehicles Using Optical Navigation Technology," Proc. of the 6th WSEAS Int. Conf. on Signal Processing, Dallas, TX, Mar. 22-24, 2007, pp. 163-166.
Khoury et al, "Evaluation of position tracking technologies for user localization in indoor construction environments," Automation in Construction, vol. 18, Issue 4, Jul. 2009, pp. 444-457, see Abstract.
Khoury, "Automated Georeferenced User Position Tracking for Contextual Information Retrieval on Construction Sites," 24th International Symposium on Automation and Robotics in Construction (ISARC 2007), pp. 11-15.
Lu et al., "Positioning and tracking construction vehicles in highly dense urban areas and building construction sites," Automation in Construction, vol. 16 (2007), pp. 647-656.
Navon et al., "Assessing research issues in Automated Project Performance Control (APPC)," Automation in Construction, vol. 16 (2007), pp. 474-484.
Navon et al., "Monitoring labor inputs: automated-data-collection model and enabling technologies," Automation in Construction, vol. 12 (2002), pp. 185-199.
Navon, "Present Status and Future Prospects of Automated Project Performance Indicators' Measurement," (ISARC 2006), pp. 400-405.
Navon, "Research on Automated Project Performance Control: An Update," 26th International Symposium on Automation and Robotics in Construction (ISARC 2009), pp. 126-128.
Teizer et al., "Analyzing the Travel Patterns of Construction Workers," The 25th International Symposium on Automation and Robotics in Construction, Jun. 26-28, 2008, pp. 391-396.
Nielsen et al., co-pending U.S. Publication No. 2010-0113244, published May 10, 2012.
Nielsen et al., co-pending U.S. Publication No. 2011-0020776, published Jan. 27, 2011.
Nielsen et al., co-pending U.S. Publication No. 2010-0065924, published Mar. 15, 2012.
Nielsen et al., co-pending U.S. Publication No. 2012-0072035, published Mar. 22, 2012.
Nielsen et al., co-pending U.S. Publication No. 2013-0002854, published Jan. 3, 2013.
Office Action dated Mar. 12, 2014 from U.S. Appl. No. 13/210,237.
Office Action dated Aug. 29, 2014 from U.S. Appl. No. 13/232,790.
Office Action dated Sep. 5, 2014 from U.S. Appl. No. 13/210,237.
Patent Examination Report dated Sep. 9, 2014 from Australian Application No. 2011289157.
Office Action dated Jul. 9, 2014 from U.S. Appl. No. 13/210,291.
Patent Examination Report dated Sep. 24, 2014 from Australian Application No. 2011301822.
Patent Examination Report dated Oct. 23, 2014 from Australian Application No. 2011289156.
Dille, Michael et al., "Outdoor Downward-Facing Optical Flow Odometry with Commodity Sensors," Field and Service Robotics, Jul. 2009, vol. 62, pp. 1-10.
Supplementary European Search Report dated Oct. 22, 2014 from EP Application No. 12779689.4.
Office Action dated Feb. 13, 2015 from U.S. Appl. No. 13/232,790.
Schumann, Arnold W., "Precise Placement and Variable Rate Fertilizer Application Technologies," Workshop on BMP Research and Extension Priorities for Horticultural Crops, pub. May 20-21, 2008, 45 pages.
Office Action dated Jan. 27, 2015 from U.S. Appl. No. 13/210,237.
Notice of Allowance dated Jan. 27, 2015 from U.S. Appl. No. 13/210,291.
US 8,847,980, 05/2013, Nielsen et al. (withdrawn).
Delorme, "Increase Efficiency and Productivity Using XMap," Business Solutions for Agriculture, Nov. 2009, 3 pages.
Nowatzki, J. et al., "Variable-rate Fertilization for Field Crops," NDSU Extension Service, Dec. 2009, 4 pages.
Office Action dated Apr. 22, 2015 from U.S. Appl. No. 13/462,794.
International Search Report and Written Opinion mailed Apr. 7, 2015 from International Application No. PCT/US14/66722.
Examination Report dated May 7, 2015 from Australian Application Number.
FICO ISS: Unique Features for Increased System Output Datacon// Cyclical Uplooking Camera Search with "The Smart Accuracy Mode"//New High-Speed Solution on Die Bonder 2100; http://www.besi.comffileadmin/data/News_Events/Spotlights/Besi_Spotlights)2010-01.pdf; retrieved from the internet on May 6, 2015; 20 pages.

\* cited by examiner

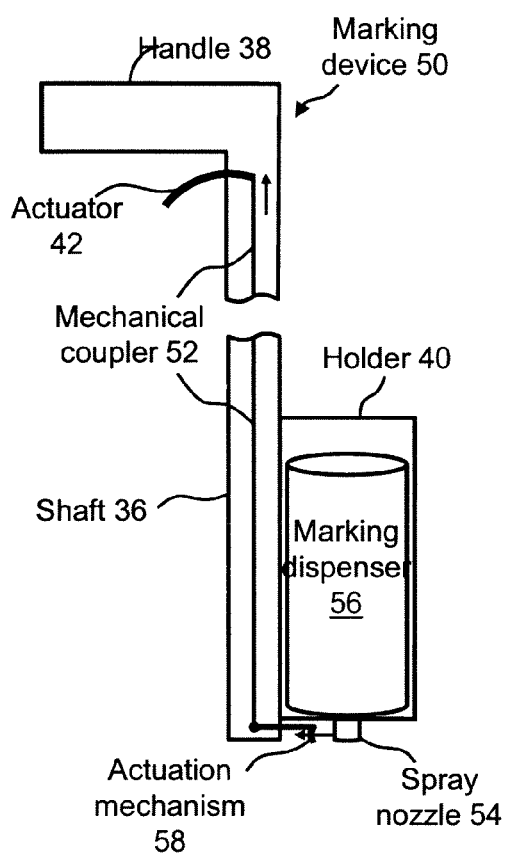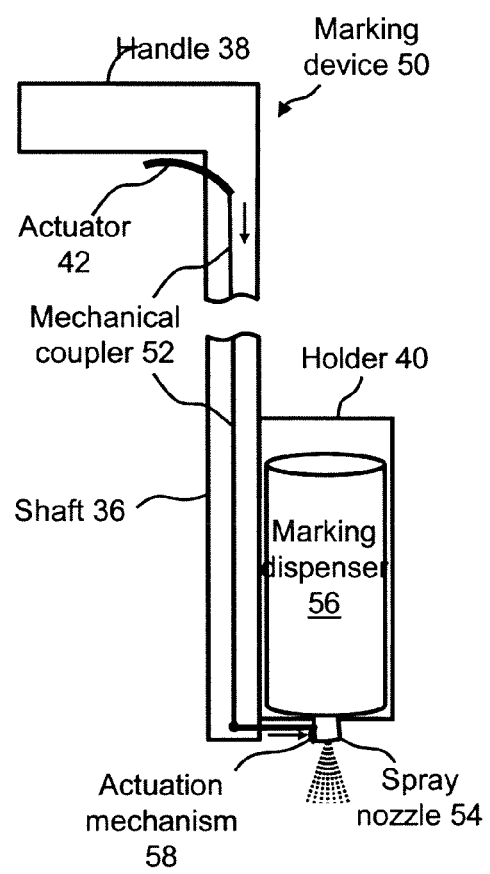
FIG. 3A
(Prior Art)
FIG. 3B
(Prior Art)

Sample "W" optical flow plot 1000

Sample grid coordinate string 1010

W:(0)(01)(1)(12)(2)(12)(1)(14)(0134)(3)(34)(47)(4578)(8)(78)(7)(67)(6)(36)

Sample "G" optical flow plot 1100

Sample grid coordinate string 1110

G: (6)(36)(3)(03)(0)(01)(1)(12)(2)(25)(5)(58)(8)(78)(7)(47)(4)(14)

Sample "L" optical flow plot 1200

Sample grid coordinate string 1210

L: (0)(01)(1)(12)(2)(25)(5)(58)(8)

Reference "W" optical flow plot 1300

Reference grid coordinate string 1310

W:(0)(01)(1)(12)(2)(1245)(4)(45)(3)(34)(3467)(47)(4578)(58)(8)(78)(7)(67)(6)

Reference "G" optical flow plot 1400

Reference grid coordinate string 1410

G: (6)(36)(3)(03)(0)(01)(1)(12)(2)(25)(5)(58)(8)(78)(7)(47)(4)(14)

Reference "L" optical flow plot 1500

Reference grid coordinate string 1510

L: (0)(01)(1)(12)(2)(25)(5)(58)(8)

METHODS AND APPARATUS FOR TRACKING MOTION AND/OR ORIENTATION OF A MARKING DEVICE

CROSS-REFERENCE TO RELATED PATENT APPLICATIONS

This application claims a priority benefit, under 35 U.S.C. §119(e), to U.S. provisional patent application Ser. No. 61/384,158, filed on Sep. 17, 2010, entitled "Methods and Apparatus for Tracking Motion and/or Orientation of Marking Device."

This application also claims a priority benefit, under 35 U.S.C. §119(e), to U.S. provisional patent application Ser. No. 61/451,007, filed Mar. 9, 2011, entitled "Methods and Apparatus for Tracking Motion and/or Orientation of Marking Device."

Each of the above-identified applications is hereby incorporated by reference herein in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 3110 providing an excavation notice to a one-call center 3120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Once facilities implicated by the locate request are identified by a one-call center (e.g., via a polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 3140 and/or one or more locate service providers 3130 (who may be acting as contracted agents of the facility owners) so that they can conduct a locate and marking operation to verify a presence or absence of the underground facilities in the dig area. For example, in some instances, a given underground facility owner 3140 may operate its own fleet of locate technicians (e.g., locate technician 3145), in which case the one-call center 3120 may send the ticket to the underground facility owner 3140. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician (e.g., locate technician 3150) to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. FIG. 2 illustrates a conventional locate device 3500 (indicated by the dashed box) that includes a transmitter 3505 and a locate receiver 3510. The transmitter 3505 is connected, via a connection point 3525, to a target object (in this example, underground facility 3515) located in the ground 3520. The transmitter generates the applied signal 3530, which is coupled to the underground facility via the connection point (e.g., to a tracer wire along the facility), resulting in the generation of a magnetic field 3535. The magnetic field in turn is detected by the locate receiver 3510, which itself may include one or more detection antenna (not shown). The locate receiver 3510 indicates a presence of a facility when it detects electromagnetic fields arising from the applied signal 3530. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 3A and 3B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 3A and 3B, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 3A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 3B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 3A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

Previous efforts at documenting locate operations have focused primarily on locate devices that employ electromagnetic fields to determine the presence of an underground facility. For example, U.S. Pat. No. 5,576,973, naming inventor Alan Haddy and entitled "Apparatus and Method for Obtaining Geographical Positional Data for an Object Located Underground" (hereafter "Haddy"), is directed to a locate device (i.e., a "locator") that receives and stores data from a global positioning system ("GPS") to identify the position of the locate device as an underground object (e.g., a cable) is detected by the locate device. Haddy notes that by recording geographical position data relating to the detected underground object, there is no need to physically mark the location of the underground object on the ground surface, and the recorded position data may be used in the future to re-locate the underground object.

Similarly, U.S. Pat. No. 7,319,387, naming inventors Willson et al. and entitled "GPS Interface for Locating Device" (hereafter "Willson"), is directed to a locate device for locating "position markers," i.e., passive antennas that reflect back RF signals and which are installed along buried utilities. In Willson, a GPS device may be communicatively coupled to the locate device, or alternatively provided as an integral part of the locate device, to store GPS coordinate data associated with position markers detected by the locate device. Electronic memory is provided in the locate device for storing a data record of the GPS coordinate data, and the data record may be uploaded to a remote computer and used to update a mapping database for utilities.

U.S. Publication No. 2006/0282280, naming inventors Stotz et al. and entitled "Ticket and Data Management" (hereafter "Stotz"), also is directed to a locate device (i.e., a "locator") including a GPS receiver. Upon detection of the presence of a utility line, Stotz' locate device can update ticket data with GPS coordinates for the detected utility line. Once the locate device has updated the ticket data, the reconfigured ticket data may be transmitted to a network.

U.S. Publication No. 2007/0219722, naming inventors Sawyer, Jr. et al. and entitled "System and Method for Collecting and Updating Geographical Data" (hereafter "Sawyer"), is directed to collecting and recording data representative of the location and characteristics of utilities and infrastructure in the field for creating a grid or map. Sawyer employs a field data collection unit including a "locating pole" that is placed on top of or next to a utility to be identified and added to the grid or map. The locating pole includes an antenna coupled to a location determination system, such as a GPS unit, to provide longitudinal and latitudinal coordinates of the utility under or next to the end of the locating pole. The data gathered by the field data collection unit is sent to a server to provide a permanent record that may be used for damage prevention and asset management operations.

SUMMARY

Applicants have appreciated that useful information may be obtained by tracking the motion and/or orientation of a marking device that is used to dispense marking material onto a target surface, e.g., to mark a presence or an absence of at least one underground facility within a dig area. Tracking information may obtained by capturing and analyzing images from a camera system attached to the marking device as the marking device is moved along the target surface. The tracking information can be analyzed to determine marking information relating to the marking material dispensed onto the target surface. For example, by tracking the motion of the marking device as it dispenses marking material, information may be obtained related to the type, location, quality or other attributes of marks made on the target surface.

One embodiment of the present invention is directed to an apparatus for tracking motion and/or orientation of a marking device that is used to dispense marking material onto a target surface to mark a presence or an absence of at least one underground facility within a dig area, wherein at least a portion of the dig area is planned to be excavated or disturbed during excavation activities. The apparatus comprises: at least one communication interface; at least one memory to store processor-executable instructions; and at least one processor communicatively coupled to the at least one memory and the at least one communication interface, wherein, upon execution of the processor-executable instructions, the at least one processor: A) analyzes at least one image of the surface being marked to obtain an optical flow plot indicative of a path on the target surface traversed by the marking device, the at least one image being captured by at least one camera system attached to the marking device; B) retrieves, from the at least one memory, a plurality of reference plots, each reference plot representing a manifestation of at least one marking pattern; and C) compares at least one portion of the optical flow plot against the plurality of reference plots to identify at least one marking pattern that likely matches the at least one portion of the optical flow plot.

In one aspect, a method is disclosed including: A) dispensing marking material onto a target surface using a marking device; B) capturing camera system data relating to at least one image using at least one camera system attached to the marking device; C) analyzing the at least one image to determine tracking information indicative of the a motion or an orientation of the marking device; and D) analyzing the tracking information to determine marking information relating to the dispensed marking material. Some embodiments include recording the marking information relating to the dispensed marking material.

In some embodiments, A) includes: forming at least one locate mark on the target surface. In some embodiments, the marking information relating to the dispensed marking material includes attribute information indicative of an attribute of the at least one locate mark. In some embodiments, the attribute includes at least one of: a presence of the at least one locate mark, a pattern of the at least one locate mark, the location of the at least one locate mark; a quality of the at least one locate mark; and the color of the at least one locate mark.

In some embodiments, C) includes: C1) obtaining an optical flow plot indicative of a path on the target surface traversed by the marking device.

In some embodiments, A) includes: A1) actuating a trigger associated with the marking device to dispense marking material; A2) obtaining timestamp information indicative of at least one period of time during which the trigger is actuated to dispense marking materials; and A3) using the timestamp information and optical flow plot obtained in C) to identify marked portions of the path.

In some embodiments, C) further includes: C2) analyzing at least a portion of the optical flow plot to determine the attribute information indicative of the attribute of the at least one locate mark.

In some embodiments, C2) includes: applying at least one pattern recognition algorithm to the optical flow plot.

In some embodiments, C2) includes: C2a) comparing at least a portion of the optical flow plot to at least one reference plot to determine the attribute information indicative of the attribute of the at least one locate mark. In some embodiments, C2a) includes: scaling the optical flow plot and the reference plot to a common reference grid including a plurality of regions; determining a first set of regions of the grid traversed by the optical flow plot; determining a second set of regions of the grid traversed by the reference plot; and comparing the first and second sets of regions. In some embodiments, C2a) includes: determining first information indicative of an order in which the optical flow plot traversed the first set of regions; determining second information indicative of an order in which the reference plot traversed the second set of regions; and comparing the first and second order information.

In some embodiments, C2a) further includes: C2a1) identifying one or more portions of the optical flow plot that substantially corresponds to a marking pattern; C2a2) generating at least one subplot from the optical flow plot containing at least one of the portions of the optical flow identified in C2a1); and C2a3) comparing the at least one subplot generated in C2a2) with at least one reference plot to determine the attribute information. Some embodiments, include: C2a4) prior to C2a3), processing the at least one subplot to facilitate C2a3). In some embodiments, C2a4) includes at least one of: scaling the at least one subplot; rotating the at least one subplot; and applying a grid to the at least one subplot.

Some embodiments include: E) obtaining, using at least one device, supplemental tracking information indicative of at least one of a location, a motion, and an orientation of the marking device. In some embodiments, the at least one device includes at least one of: a global positioning system device; a triangulation device; an inertial measurement unit, an accelerometer; a gyroscope, a sonar range finder, a laser range finder, and an electronic compass.

Some embodiments include recording the supplemental tracking information.

In some embodiments, D) includes: analyzing the tracking information and at least some of the supplemental tracking information to determine the marking information.

Some embodiments include locating at least one facility buried under the target surface.

In another aspect, a marking apparatus for dispensing marking material onto a target surface is disclosed including: at least one camera system attached to the marking apparatus; and control electronics communicatively coupled to the at least one camera system and including a processing unit. The processing unit is configured to: receive camera system data generated by the at least one camera system; analyze the camera system data to determine tracking information indicative of the motion or orientation of the marking apparatus; and analyze the tracking information to determine marking information relating to the marking material when dispensed by the marking apparatus.

Some embodiments include at least one memory communicatively couple to the processing unit, where the memory is configured to record the marking information.

In some embodiments, the marking information includes attribute information indicative of an attribute of at least one locate mark on the target surface. In some embodiments, e the attribute includes at least one of: a presence of the at least one locate mark; a pattern of the at least one locate mark, a location of the at least one locate mark; a quality of the at least one locate mark; and a color of the at least one locate mark.

In some embodiments, the tracking information includes an optical flow plot indicative of a path on the target surface traversed by the marking device.

Some embodiments include a triggering system including: a trigger associated with the marking device; an actuation mechanism configured to dispense the marking material from a marker container when the trigger is actuated; and a signal generator to send a trigger signal to the control electronics indicative of an actuation of the trigger. In some embodiments, the signal generator includes an electronic switch. In some embodiments, the trigger includes a mechanical trigger. In some embodiments, the trigger includes an electronic trigger. In some embodiments, the electronic trigger includes a touch screen display or a wireless trigger.

In some embodiments, the processing unit is configured to: in response to the trigger signal, obtain timestamp information indicative of periods of time during which the trigger is actuated to dispense marking materials; and identify marked portions of the path based on the timestamp information and the optical flow plot.

In some embodiments, the processing unit in configured to analyze at least a portion of the optical flow plot to determine information indicative of an attribute of the at least one locate mark.

In some embodiments, the processing unit in configured to apply at least one pattern recognition algorithm to the optical flow plot.

In some embodiments, the processing unit in configured to compare at least a portion of the optical flow plot to at least one reference plot to determine information indicative of an attribute of the at least one locate mark.

Some embodiments include: at least one input device in communication with the control electronics, where the at least one input device is configured to generate supplemental tracking information indicative of at least one of the location, the motion, and the orientation of the marking device. In some embodiments, the at least one input device includes at least one of: a Global Positioning System device; a Global Navigation Satellite System device; a ground-based triangulation device; an inertial measurement unit; an accelerometer, a gyroscope, a sonar range finder; a laser range finder, and an electronic compass.

In some embodiments: the processor is configured to: receive the supplemental tracking information; and analyze the tracking information and at least some of the supplemental tracking information to determine the marking information.

Some embodiments include a communication unit. Some embodiments include a locate device configured to locating at least one facility buried under the target surface.

In some embodiments, the memory stores the at least one reference plot, and where the at least one reference plot represents a manifestation of at least one marking pattern.

In another aspect, an apparatus is disclosed for tracking a motion and/or an orientation of a marking device used to dispense a marking material onto a target surface, the apparatus including: at least one communication interface; at least one memory to store processor-executable instructions; and at least one processor communicatively coupled to the at least one memory and the at least one communication interface. In some embodiments, upon execution of the processor-executable instructions, the at least one processor: A) analyzes at least one image of the target surface being marked to obtain an optical flow plot indicative of a path on the target surface traversed by the marking device, the at least one image being captured by at least one camera system attached to the marking device; B) retrieves, from the at least one memory, a plurality of reference plots, respectively representing a plurality of reference marking patterns; and C) compares at least one portion of the optical flow plot to at least some of the plurality of reference plots retrieved in B) to identify at least one reference marking pattern of the plurality of reference marking patterns that substantially matches the at least one portion of the optical flow plot obtained in A). In some embodiments, the apparatus is located remotely from the marking device, and where the processor controls the at least one communication interface so as to receive the at least one image from the at least one camera system.

Some embodiments include a wireless communication link between the processing unit and the at least one camera system.

Some embodiments include the marking device. The marking device may include a triggering system including: a trigger; a marking container an actuation mechanism to dispense the marking material from the marker container when the trigger is actuated; and a signal generator in communication with the processing unit to send a trigger signal to the processing unit indicative of the actuation of the trigger.

Some embodiments include a wireless communication link between the signal generator and the at least one camera system.

In some embodiments, the memory and the processing unit are attached to or integral with the marking device.

Some embodiments include the at least one camera system attached to the marking device.

Some embodiments including the marking device.

In another aspect, an apparatus is disclosed for tracking a motion and/or an orientation of a marking device used to dispense a marking material onto a target surface to mark a presence or an absence of at least one underground facility within a dig area, where at least a portion of the dig area is planned to be excavated or disturbed during excavation activities. The apparatus includes at least one communication interface; at least one memory to store processor-executable instructions; and at least one processor communicatively coupled to the at least one memory and the at least one communication interface. Upon execution of the processor-executable instructions, the at least one processor: A) analyzes at least one image of the target surface being marked to obtain an optical flow plot indicative of a path on the target surface traversed by the marking device, the at least one image being captured by at least one camera system attached to the marking device; B) retrieves, from the at least one memory, a plurality of reference plots, respectively representing a plurality of reference marking patterns; and C) compares at least one portion of the optical flow plot to at least some of the plurality of reference plots retrieved in B) to identify at least one reference marking pattern of the plurality of reference marking patterns that substantially matches the at least one portion of the optical flow plot obtained in A).

In another aspect, a computer program product is disclosed including a computer readable medium having a computer readable program code embodied therein. The computer readable program code is adapted to be executed to implement a method including: A) receiving camera system data from at least one camera system attached to a marking device dispensing a marking material onto a target surface; B) analyzing the camera system data to determine tracking information indicative of a motion or an orientation of the marking device; and C) analyzing the tracking information to determine marking information relating to the dispensed marking material.

In another aspect, a method for tracking a motion and/or an orientation of a marking device used to dispense a marking material onto a target surface, the method including: A) analyzing at least one image of the target surface being marked to obtain an optical flow plot indicative of a path on the target surface traversed by the marking device, the at least one image being captured by at least one camera system attached to the marking device; B) comparing at least one portion of the optical flow plot to at least some of a plurality of reference plots respectively representing a plurality of reference marking patterns to identify at least one reference marking pattern of the plurality of reference marking patterns obtained in A) that substantially matches the at least one portion of the optical flow plot obtained in A).

In another aspect, a computer program product is disclosed including a computer readable medium having a computer readable program code embodied therein, the computer readable program code adapted to be executed to implement a method for tracking a motion and/or an orientation of a marking device used to dispense a marking material onto a target surface. The method includes: A) analyzing at least one image of the target surface being marked to obtain an optical flow plot indicative of a path on the target surface traversed by the marking device, the at least one image being captured by at least one camera system attached to the marking device; B) comparing at least one portion of the optical flow plot to at least some of a plurality of reference plots respectively representing a plurality of reference marking patterns to identify at least one reference marking pattern of the plurality of reference marking patterns that substantially matches the at least one portion of the optical flow plot obtained in A).

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "user" refers to an individual utilizing a locate device and/or a marking device and may include, but is not limited to, land surveyors, locate technicians, and support personnel.

The following U.S. published patents and applications are hereby incorporated herein by reference in their entirety:

U.S. patent application Ser. No. 13/210,291, filed Aug. 15, 2011, and entitled "Methods, Apparatus and Systems for Surface Type Detection in Connection with Locate and Marking Operations;"

U.S. patent application Ser. No. 13/210,237, filed Aug. 15, 2011, and entitled "Methods, Apparatus and Systems for Marking Material Color Detection in Connection with Locate and Marking Operations;"

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2011-0135163-A1, published Jun. 9, 2011, filed Feb. 16, 2011, and entitled "Methods and Apparatus for Providing Unbuffered Dig Area Indicators on Aerial Images to Delimit Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0198663 A1, published Aug. 5, 2010, filed Feb. 5, 2010, and entitled "Methods and Apparatus for Overlaying Electronic Marking Information on Facilities Map Information and/or Other Image Information Displayed on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0256825-A1, published Oct. 7, 2010, filed Jun. 9, 2010, and entitled "Marking Apparatus Having Operational Sensors For Underground Facility Marking Operations, And Associated Methods And Systems;"

U.S. publication no. 2010-0255182-A1, published Oct. 7, 2010, filed Jun. 9, 2010, and entitled "Marking Apparatus Having Operational Sensors For Underground Facility Marking Operations, And Associated Methods And Systems;"

U.S. publication no. 2010-0245086-A1, published Sep. 30, 2010, filed Jun. 9, 2010, and entitled "Marking Apparatus Configured To Detect Out-Of-Tolerance Conditions In Connection With Underground Facility Marking Operations, And Associated Methods And Systems;"

U.S. publication no. 2010-0247754-A1, published Sep. 30, 2010, filed Jun. 9, 2010, and entitled "Methods and Apparatus For Dispensing Marking Material In Connection With Underground Facility Marking Operations Based on Environmental Information and/or Operational Information;"

U.S. publication no. 2010-0262470-A1, published Oct. 14, 2010, filed Jun. 9, 2010, and entitled "Methods, Apparatus, and Systems For Analyzing Use of a Marking Device By a Technician To Perform An Underground Facility Marking Operation;"

U.S. publication no. 2010-0263591-A1, published Oct. 21, 2010, filed Jun. 9, 2010, and entitled "Marking Apparatus Having Environmental Sensors and Operations Sensors for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2010-0253511-A1, published Oct. 7, 2010, filed Jun. 18, 2010, and entitled "Locate Apparatus Configured to Detect Out-of-Tolerance Conditions in Connection with Underground Facility Locate Operations, and Associated Methods and Systems;"

U.S. publication no. 2010-0257029-A1, published Oct. 7, 2010, filed Jun. 18, 2010, and entitled "Methods, Apparatus, and Systems For Analyzing Use of a Locate Device By a Technician to Perform an Underground Facility Locate Operation;"

U.S. publication no. 2010-0253513-A1, published Oct. 7, 2010, filed Jun. 18, 2010, and entitled "Locate Transmitter Having Enhanced Features For Underground Facility Locate Operations, and Associated Methods and Systems;"

U.S. publication no. 2010-0253514-A1, published Oct. 7, 2010, filed Jun. 18, 2010, and entitled "Locate Transmitter Configured to Detect Out-of-Tolerance Conditions In Connection With Underground Facility Locate Operations, and Associated Methods and Systems;"

U.S. publication no. 2010-0256912-A1, published Oct. 7, 2010, filed Jun. 18, 2010, and entitled "Locate Apparatus for Receiving Environmental Information Regarding Underground Facility Marking Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2010-0205264-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0205031-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0259381-A1, published Oct. 14, 2010, filed Jun. 28, 2010, and entitled "Methods, Apparatus and Systems for Notifying Excavators and Other Entities of the Status of in-Progress Underground Facility Locate and Marking Operations;"

U.S. publication no. 2010-0262670-A1, published Oct. 14, 2010, filed Jun. 28, 2010, and entitled "Methods, Apparatus and Systems for Communicating Information Relating to the Performance of Underground Facility Locate and Marking Operations to Excavators and Other Entities;"

U.S. publication no. 2010-0259414-A1, published Oct. 14, 2010, filed Jun. 28, 2010, and entitled "Methods, Apparatus And Systems For Submitting Virtual White Line Drawings And Managing Notifications In Connection With Underground Facility Locate And Marking Operations;"

U.S. publication no. 2010-0268786-A1, published Oct. 21, 2010, filed Jun. 28, 2010, and entitled "Methods, Apparatus and Systems for Requesting Underground Facility Locate and Marking Operations and Managing Associated Notifications;"

U.S. publication no. 2010-0201706-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205555-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205195-A1, published Aug. 12, 2010, filed Jun. 1, 2009, and entitled "Methods and Apparatus for Associating a Virtual White Line (VWL) Image with Corresponding Ticket Information for an Excavation Project;"

U.S. publication no. 2010-0205536-A1, published Aug. 12, 2010, filed Jun. 1, 2009, and entitled "Methods and Apparatus for Controlling Access to a Virtual White Line (VWL) Image for an Excavation Project;"

U.S. publication no. 2010-0228588-A1, published Sep. 9, 2010, filed Feb. 11, 2010, and entitled "Management System, and Associated Methods and Apparatus, for Providing Improved Visibility, Quality Control and Audit Capability for Underground Facility Locate and/or Marking Operations;"

U.S. publication no. 2010-0324967-A1, published Dec. 23, 2010, filed Jul. 9, 2010, and entitled "Management System, and Associated Methods and Apparatus, for Dispatching Tickets, Receiving Field Information, and Performing A Quality Assessment for Underground Facility Locate and/or Marking Operations;"

U.S. publication no. 2010-0318401-A1, published Dec. 16, 2010, filed Jul. 9, 2010, and entitled "Methods and Apparatus for Performing Locate and/or Marking Operations with Improved Visibility, Quality Control and Audit Capability;"

U.S. publication no. 2010-0318402-A1, published Dec. 16, 2010, filed Jul. 9, 2010, and entitled "Methods and Apparatus for Managing Locate and/or Marking Operations;"

U.S. publication no. 2010-0318465-A1, published Dec. 16, 2010, filed Jul. 9, 2010, and entitled "Systems and Methods for Managing Access to Information Relating to Locate and/or Marking Operations;"

U.S. publication no. 2010-0201690-A1, published Aug. 12, 2010, filed Apr. 13, 2009, and entitled "Virtual White Lines (VWL) Application for Indicating a Planned Excavation or Locate Path;"

U.S. publication no. 2010-0205554-A1, published Aug. 12, 2010, filed Apr. 13, 2009, and entitled "Virtual White Lines (VWL) Application for Indicating an Area of Planned Excavation;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2011-0060496-A1, published Mar. 10, 2011, filed Aug. 10, 2010, and entitled "Systems and Methods for Complex Event Processing of Vehicle Information and Image Information Relating to a Vehicle;"

U.S. publication no. 2011-0093162-A1, published Apr. 21, 2011, filed Dec. 28, 2010, and entitled "Systems And Methods For Complex Event Processing Of Vehicle-Related Information;"

U.S. publication no. 2011-0093306-A1, published Apr. 21, 2011, filed Dec. 28, 2010, and entitled "Fleet Management Systems And Methods For Complex Event Processing Of Vehicle-Related Information Via Local And Remote Complex Event Processing Engines;"

U.S. publication no. 2011-0093304-A1, published Apr. 21, 2011, filed Dec. 29, 2010, and entitled "Systems And Methods For Complex Event Processing Based On A Hierarchical Arrangement Of Complex Event Processing Engines;"

U.S. publication no. 2010-0257477-A1, published Oct. 7, 2010, filed Apr. 2, 2010, and entitled "Methods, Apparatus, and Systems for Documenting and Reporting Events Via Time-Elapsed Geo-Referenced Electronic Drawings;"

U.S. publication no. 2010-0256981-A1, published Oct. 7, 2010, filed Apr. 2, 2010, and entitled "Methods, Apparatus, and Systems for Documenting and Reporting Events Via Time-Elapsed Geo-Referenced Electronic Drawings;"

U.S. publication no. 2010-0205032-A1, published Aug. 12, 2010, filed Feb. 11, 2010, and entitled "Marking Apparatus Equipped with Ticket Processing Software for Facilitating Marking Operations, and Associated Methods;"

U.S. publication no. 2011-0035251-A1, published Feb. 10, 2011, filed Jul. 15, 2010, and entitled "Methods, Apparatus, and Systems for Facilitating and/or Verifying Locate and/or Marking Operations;"

U.S. publication no. 2011-0035328-A1, published Feb. 10, 2011, filed Jul. 15, 2010, and entitled "Methods, Apparatus, and Systems for Generating Technician Checklists for Locate and/or Marking Operations;"

U.S. publication no. 2011-0035252-A1, published Feb. 10, 2011, filed Jul. 15, 2010, and entitled "Methods, Apparatus, and Systems for Processing Technician Checklists for Locate and/or Marking Operations;"

U.S. publication no. 2011-0035324-A1, published Feb. 10, 2011, filed Jul. 15, 2010, and entitled "Methods, Apparatus, and Systems for Generating Technician Workflows for Locate and/or Marking Operations;"

U.S. publication no. 2011-0035245-A1, published Feb. 10, 2011, filed Jul. 15, 2010, and entitled "Methods, Apparatus, and Systems for Processing Technician Workflows for Locate and/or Marking Operations;"

U.S. publication no. 2011-0035260-A1, published Feb. 10, 2011, filed Jul. 15, 2010, and entitled "Methods, Apparatus, and Systems for Quality Assessment of Locate and/or Marking Operations Based on Process Guides;"

U.S. publication no. 2010-0256863-A1, published Oct. 7, 2010, filed Apr. 2, 2010, and entitled "Methods, Apparatus, and Systems for Acquiring and Analyzing Vehicle Data and Generating an Electronic Representation of Vehicle Operations;"

U.S. publication no. 2011-0022433-A1, published Jan. 27, 2011, filed Jun. 24, 2010, and entitled "Methods and Apparatus for Assessing Locate Request Tickets;"

U.S. publication no. 2011-0040589-A1, published Feb. 17, 2011, filed Jul. 21, 2010, and entitled "Methods and Apparatus for Assessing Complexity of Locate Request Tickets;"

U.S. publication no. 2011-0046993-A1, published Feb. 24, 2011, filed Jul. 21, 2010, and entitled "Methods and Apparatus for Assessing Risks Associated with Locate Request Tickets;"

U.S. publication no. 2011-0046994-A1, published Feb. 17, 2011, filed Jul. 21, 2010, and entitled "Methods and Apparatus for Multi-Stage Assessment of Locate Request Tickets;"

U.S. publication no. 2011-0040590-A1, published Feb. 17, 2011, filed Jul. 21, 2010, and entitled "Methods and Apparatus for Improving a Ticket Assessment System;"

U.S. publication no. 2011-0020776-A1, published Jan. 27, 2011, filed Jun. 25, 2010, and entitled "Locating Equipment for and Methods of Simulating Locate Operations for Training and/or Skills Evaluation;"

U.S. publication no. 2010-0285211-A1, published Nov. 11, 2010, filed Apr. 21, 2010, and entitled "Method Of Using Coded Marking Patterns In Underground Facilities Locate Operations;"

U.S. publication no. 2011-0137769-A1, published Jun. 9, 2011, filed Nov. 5, 2010, and entitled "Method Of Using Coded Marking Patterns In Underground Facilities Locate Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2011-0007076-A1, published Jan. 13, 2011, filed Jul. 7, 2010, and entitled, "Methods, Apparatus and Systems for Generating Searchable Electronic Records of Underground Facility Locate and/or Marking Operations;"

U.S. publication no. 2011-0131081-A1, published Jun. 2, 2011, filed Oct. 29, 2010, and entitled "Methods, Apparatus, and Systems for Providing an Enhanced Positive Response in Underground Facility Locate and Marking Operations;"

U.S. publication no. 2011-0060549-A1, published Mar. 10, 2011, filed Aug. 13, 2010, and entitled, "Methods and Apparatus for Assessing Marking Operations Based on Acceleration Information;"

U.S. publication no. 2011-0117272-A1, published May 19, 2011, filed Aug. 19, 2010, and entitled, "Marking Device with Transmitter for Triangulating Location During Locate Operations;"

U.S. publication no. 2011-0045175-A1, published Feb. 24, 2011, filed May 25, 2010, and entitled, "Methods and Marking Devices with Mechanisms for Indicating and/or Detecting Marking Material Color;"

U.S. publication no. 2011-0191058-A1, published Aug. 4, 2011, filed Aug. 11, 2010, and entitled, "Locating Equipment Communicatively Coupled to or Equipped with a Mobile/Portable Device;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2011-0095885 A9 (Corrected Publication), published Apr. 28, 2011, and entitled, "Methods And Apparatus For Generating Electronic Records Of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;"

U.S. publication no. 2010-0085054 A1, published Apr. 8, 2010, filed Sep. 30, 2009, and entitled, "Systems and Methods for Generating Electronic Records of Locate And Marking Operations;" and U.S. publication no. 2011-0046999-A1, published Feb. 24, 2011, filed Aug. 4, 2010, and entitled, "Methods and Apparatus for Analyzing Locate and Marking Operations by Comparing Locate Information and Marking Information."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIGS. 3A and 3B show a conventional marking device in an actuated and non-actuated state, respectively.

DETAILED DESCRIPTION

Figure 1:
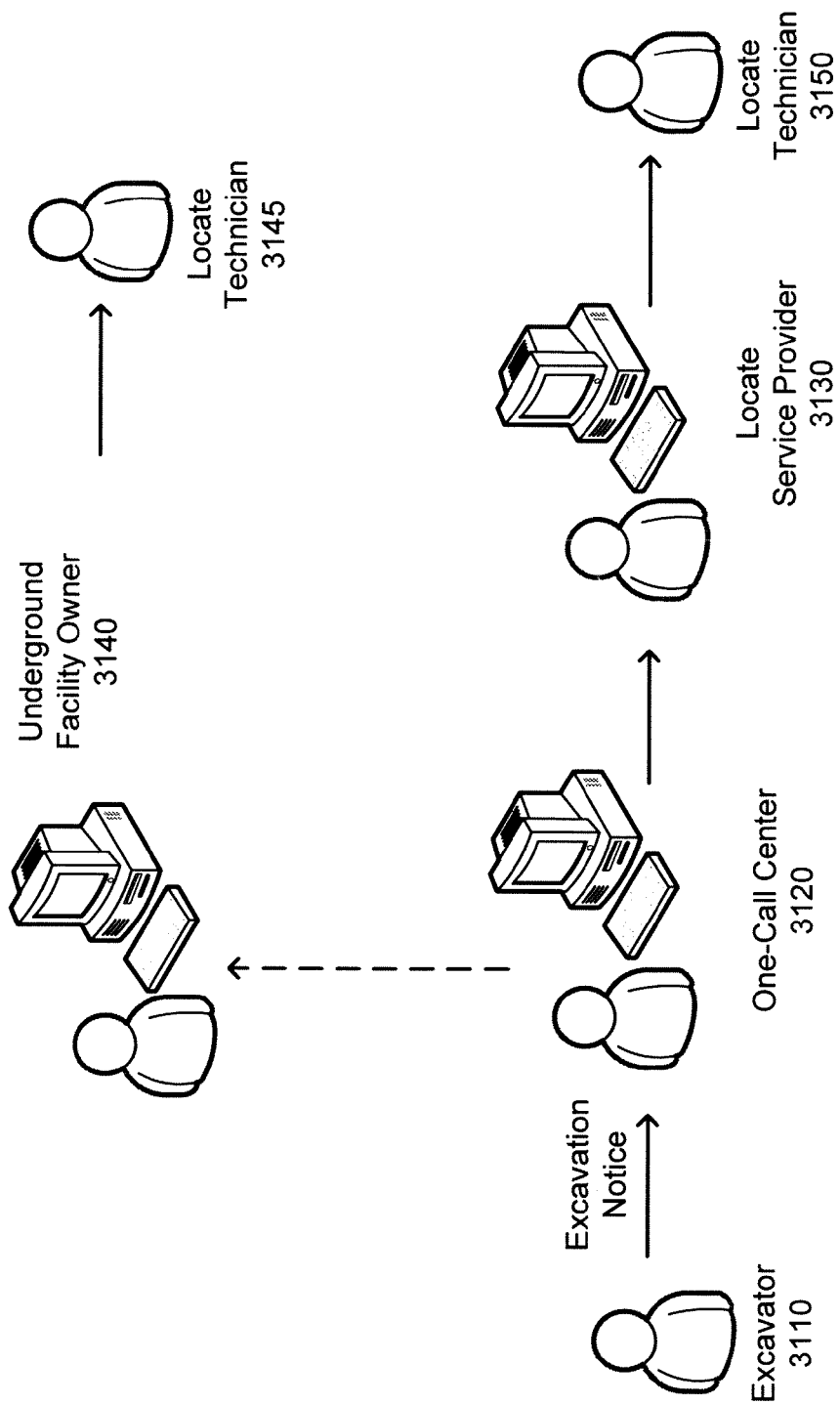
FIG. 1 shows an example in which a locate and marking operation is initiated as a result of an excavator providing an excavation notice to a one-call center.
Figure 2:
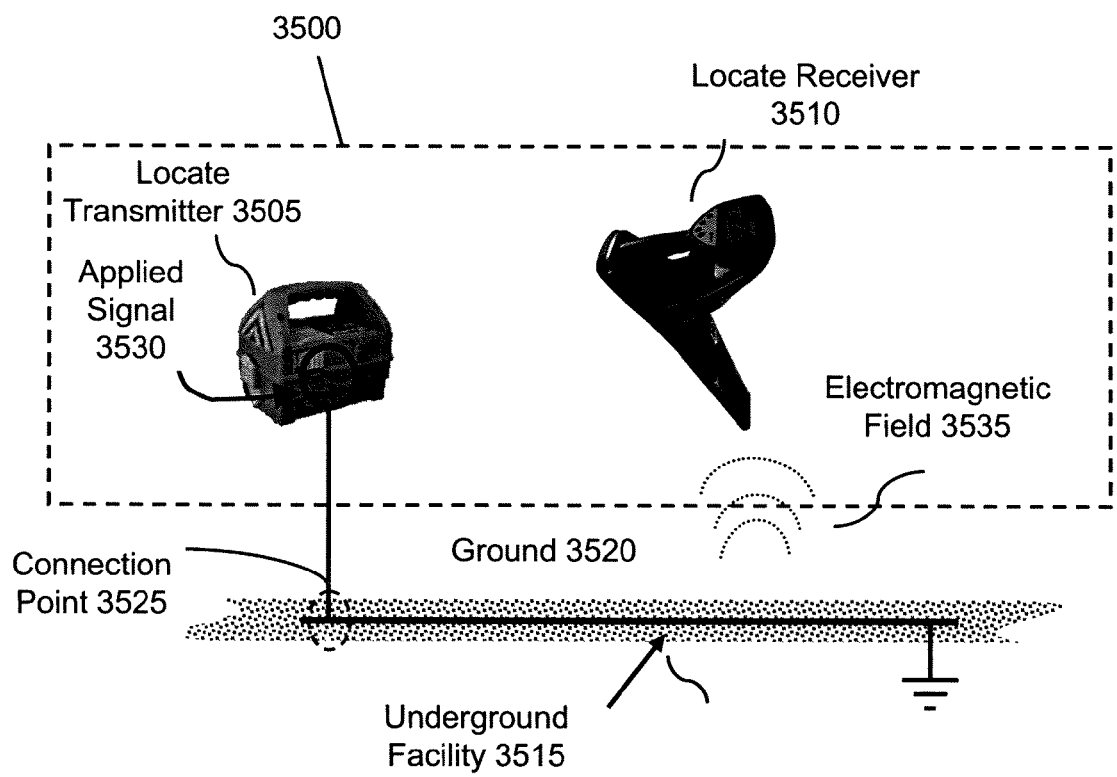
FIG. 2 shows one example of a conventional locate instrument set including a locate transmitter and a locate receiver.

Applicants have recognized and appreciated that uncertainties which may be attendant to locate and marking operations may be significantly reduced by collecting various information particularly relating to the marking operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location of where an underground facility was detected via a locate device during a locate operation.

Applicants have further recognized and appreciated that building a more comprehensive electronic record of information relating to marking operations further facilitates ensuring the accuracy of such operations. For example, the location at which an underground facility ultimately is detected during a locate operation is not always where the technician physically marks the ground, pavement or other surface during a marking operation; in fact, technician imprecision or negligence, as well as various ground conditions and/or different operating conditions amongst different locate device, may in some instances result in significant discrepancies between detected location and physical locate marks. Likewise, other aspects of physical marks (e.g., color, shape, orientation, etc.) may be susceptible to inaccuracy due to human, environmental, or other factors. Accordingly, having documentation (e.g., an electronic record) of what, and where, physical locate marks were actually dispensed (e.g., what an excavator encounters when arriving to a work site) is notably more relevant to the assessment of liability in the event of damage and/or injury than where an underground facility was detected prior to marking.

Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information.

Applicants have further appreciated and recognized that, in at least some instances, it may be desirable to document and/or monitor other aspects of the performance of a marking operation in addition to, or instead of, applied physical marks. One aspect of interest may be the motion of a marking device, since motion of the marking device may be used to determine, among other things, whether the marking operation was performed at all, a manner in which the marking operation was performed (e.g., quickly, slowly, smoothly, within standard operating procedures or not within standard operating procedures, in conformance with historical trends or not in conformance with historical trends, etc.), a characteristic of the particular technician performing the marking operation, accuracy of the marking device, and/or a location of marking material (e.g., paint) dispensed by the marking device. Thus, it may be desirable to document and/or monitor motion of the marking device during performance of a marking operation.

Various types of motion of a marking device may be of interest in any given scenario, and thus various devices (e.g., motion detectors) may be used for detecting the motion of interest. For instance, linear motion (e.g., motion of the marking device parallel to a ground surface under which one or more facilities are buried) and/or rotational (or "angular") motion may be of interest (e.g., rotation of a tip of the marking device around a pivot point when the marking device is swung by a technician). Various types of sensors/detectors may be used to detect these types of motion. As one example, an accelerometer may be used to collect acceleration data that may be converted into velocity data and/or position data so as to provide an indication of linear motion (e.g., along one, two, or three axes of interest) and/or rotational motion. As another example, an inertial motion unit (IMU), which typically includes multiple accelerometers and gyroscopes (e.g., three accelerometers and three gyroscopes such that there is one accelerometer and gyroscope for each of three orthogonal axes), may be used to determine various characteristics of the motion of the marking device, such as velocity, orientation and gravitational forces.

Applicants have recognized and appreciated that motion of a marking device may also be detected by analyzing images of a target surface being marked or traversed by the marking device. In some illustrative embodiments, a marking device is provided that has a camera system and image analysis software installed therein (hereafter called an imaging-enabled marking device). In certain embodiments, the camera system may include one or more digital video cameras. Alternatively, the camera system may include one or more optical flow chips and/or other components to facilitate acquisition of various image information. In other embodiments, other devices may be used in combination with the camera system. These other devices may include, but are not limited to, an inertial measurement unit (IMU), a sonar range finder, an electronic compass, and any combinations thereof.

Figure 4:
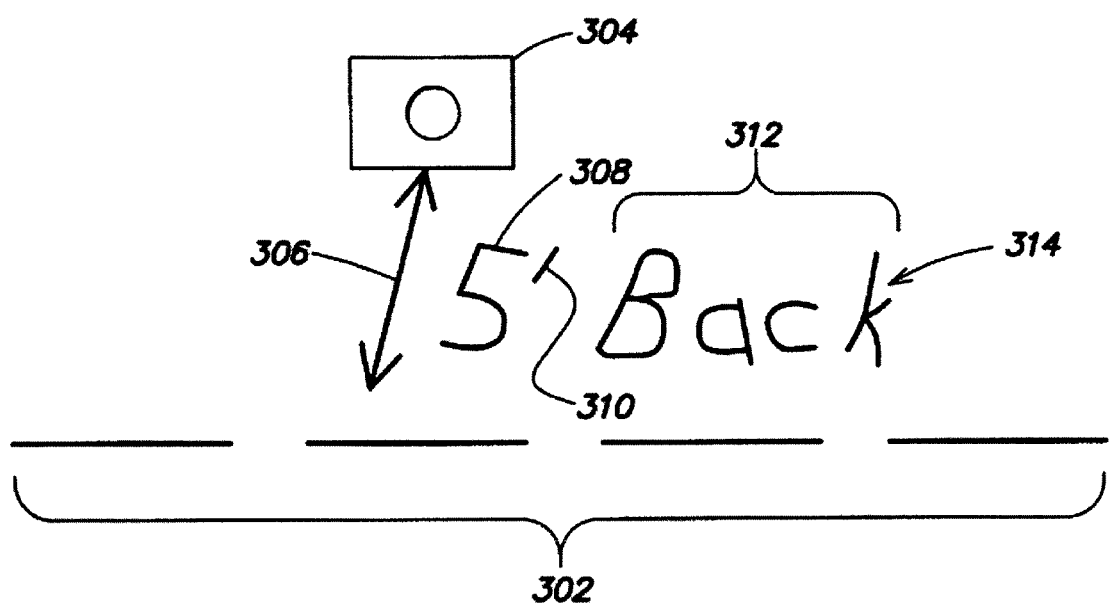
FIG. 4 shows a top view of an example of locate marks dispensed by a locate technician during a locate and marking operation.

The camera system and image analysis software may be used for tracking motion and/or orientation of the marking device. For example, the image analysis software may include algorithms for performing optical flow calculations based on the images of the target surface captured by the camera system. Additionally, the camera system and image analysis software may be used for correlating the motion and/or orientation of the imaging-enabled marking device to one or more marking patterns, such as locate specific marking patterns used by locate technicians to mark the presence and/or absence of underground facilities. For example, the marking technician may paint dot patterns or lines patterns to mark the presence or absence of an underground facility. The marking technician may form symbols, numbers, and/or letters/words during performance of the marking operation. FIG. 4 provides a top view (e.g., a bird's eye view) of a non-limiting example of the types of locate marks that are commonly made on the ground or other surface during marking operations, although other kinds are also possible. Such marks may be made with any suitable type of marking material, including paint (e.g., from a spray paint can), chalk, dye and powder, among other possibilities.

The collection of marks illustrated in the non-limiting example of FIG. 4 may be formed in a situation in which a detected underground facility is located a certain distance from an easily identifiable landmark. In such situations, a marking technician may identify the location of the facility and may also include an indication (e.g., "directions") of where the facility is relative to the easily identifiable landmark, to aid others in finding the facility in the future. Thus, in the non-limiting example of FIG. 4, the locate marks include a lines pattern 302 (so called because it includes multiple lines) which indicates the location of an underground facility. A landmark (e.g., a telephone pole) 304 is located nearby to the underground facility. Thus, the marks also include an arrow 306, which is one example of a symbol that may be formed during the marking operation, pointing from the landmark to the lines pattern, as well as the text "5' Back," in the form of a number "5" 308, an apostrophe 310 (another example of a symbol), and the word 312 including letters 314, indicating that the facility is located five feet from the landmark in the direction of the arrow. Again, other locate marks may be formed in other scenarios, as those illustrated are merely examples. For instance, other symbols may include squares, triangles, and circles, among others. Different numbers, patterns (e.g., dotting patterns in addition to or instead of lines patterns), and words may also be marked.

It may be desirable to have a record of these types of markings or any other type of marking(s) made during the marking operation, including information such as the existence of such marks, the locations of the marks, and the quality of the marks (e.g., whether the marks are made with uniform width, uniform height, whether they are smooth, etc.). Because forming any of these types of marks typically involves moving the marking device, data indicative of the motion of the marking device during the marking operation may be used to determine the above-listed attributes (i.e., location, quality, etc.) of locate marks made during the marking operation.

When forming a locate mark by dispensing marking material, the marking material dispenser is typically located near the ultimate location at which the marking material is deposited. In particular, it is typical for the marking material dispenser to be within approximately a foot of the surface on which the marking material is being dispensed (and in some embodiments typically between six to eight inches from the surface), and often the marking material dispenser is held approximately vertically above the point(s) on the surface at which the marking material is to be dispensed (though it should be appreciated that this is not always the situation, and the various aspects described herein are not limited to situations in which a marking device is used in this manner). Thus, to form a particular mark the marking material dispenser is typically moved in a manner that simulates (or is otherwise indicative of) the resulting mark. As a non-limiting example, to paint an "S" on the ground the marking material dispenser may be moved in an "S" while the marking material (e.g., paint) is being dispensed.

Accordingly, in some embodiments, one or more digital video cameras may be mounted on a marking device near the marking material dispenser to capture images of the target surface as marking material is being dispensed onto the target surface. Alternatively, various embodiments may use other image detection hardware, including, but not limited to optical flow chips, and the like. The images captured by the one or more camera systems may be analyzed to determine a pattern of apparent motion of the marking device which, as discussed above, may be used to infer the marking pattern being drawn using the marking device.

For instance, optical flow calculations may be performed based on the captured images to obtain an optical flow plot that may be indicative of a path on the target surface traversed by the marking device. Some portions of this path (e.g., those traversed by the marking device while the marking material dispenser is activated by the locate technician) may be marked, while other portions may not be marked. Therefore, timestamp data from an actuation mechanism of the marking material dispenser may be used to estimate which portions of the optical flow plot are marked. For instance, a portion of the optical flow plot corresponding to a period of time between an actuation "ON" event and an actuation "OFF" event may be identified as a marked portion.

In some further embodiments, the portions of an optical flow plot identified as being marked may be separated into subplots likely to include manifestations of individual marking patterns, such as characters and geometric shapes. Each subplot may be analyzed to determine which marking pattern it likely represents. For example, each subplot may be compared against one or more reference plots including manifestations of known individual marking patterns. The reference plots may be optical flow subplots generated during prior locate and marking operations and may be manually matched to individual marking patterns.

In yet some further embodiments, the optical flow subplots obtained from a locate and marking operation may be processed and/or manipulated to facilitate comparisons between the reference plots. For example, an optical flow subplot may be scaled to a standard-size grid (e.g., a 3×3 grid) shared by the reference plots. This may be accomplished, for instance, by first identifying a square in the image encompassing the optical flow subplot (e.g., a smallest such square) and then scaling the square either up or down to match the standard-size grid. As another example, the optical flow subplot may be rotated to various degrees prior to being compared with a reference plot, to accommodate for variations in orientation of the marking pattern as drawn by the locate technician.

In yet some further embodiments, a comparison between an optical flow subplot and a reference plot may be carried out by dividing the standard-size grid into multiple regions and determining whether the optical flow subplot and the reference traverse the same set (or substantially similar sets) of regions. In some instances, the order in which the optical flow subplot traverses the regions may also be compared with the order in which the reference plot traverses the regions, so that a match is found only where the two plots traverse the regions in the same order (or some equivalent orders, e.g. a reversed order).

In summary, unlike traditional location tracking mechanisms that rely on Global Positioning System (GPS) technology and/or certain triangulation techniques, the present disclosure provides techniques based on image analysis for tracking motion and/or orientation of an imaging-enabled marking device (e.g., distance and/or path traveled while dispensing marking patterns during locate operations). However, it should be appreciated that these image-based techniques do not necessarily replace GPS-based techniques; rather, they may be used ito supplement GPS-based techniques. Furthermore, the image-based techniques for tracking motion and/or orientation of a marking device may be employed for purposes other than analyzing marking patterns drawn by the marking device.

Following below are more detailed descriptions of various concepts related to, and embodiments of, inventive systems, methods and apparatus for tracking motion and/or orientation of a marking device during locate and marking operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 5A:
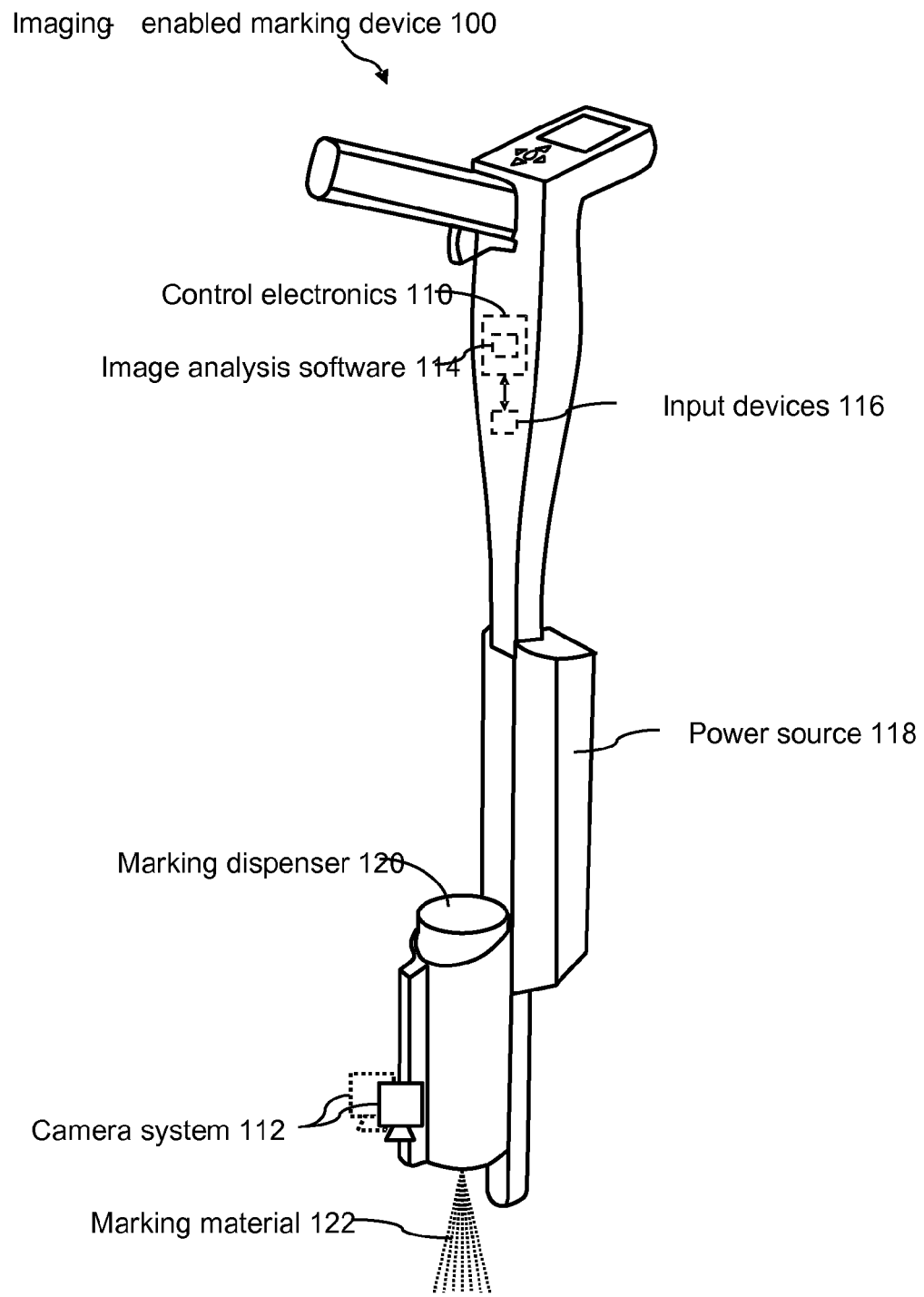
FIG. 5A shows a perspective view of an example of an imaging-enabled marking device that has a camera system and image analysis software installed therein for tracking motion and/or orientation of the marking device, according to some embodiments of the present disclosure.

FIG. 5A shows a perspective view of an example of an imaging-enabled marking device 100 that has a camera system 112 and image analysis software 114 installed therein. In this example, the imaging-enabled marking device 100 is an electronic marking device that is capable of creating electronic records of locate operations using the camera system and image analysis software that are installed therein. The image analysis software may alternatively be remote from the marking device and operate on data uploaded from the marking device, either contemporaneously to collection of the data or at a later time. As shown in FIG. 5A, the marking device 100 also includes various control electronics 110, examples of which are discussed in greater detail below with reference to FIG. 6.

For purposes of the present disclosure, it should be appreciated that the terminology "camera system" refers generically to any one or more components that facilitate acquisition of image data relevant to the determination of movement and/or orientation of a marking device. In some exemplary implementations, "camera system" also may refer to any one or more components that facilitate acquisition of image and/or color data relevant to the determination of marking material color in connection with a marking material dispensed by the marking device. In particular, the term "camera system" as used herein is not necessarily limited to conventional camera or video devices (e.g., digital cameras or video recorders) that capture images of the environment, but may also or alternatively refer to any of a number of sensing and/or processing components (e.g., semiconductor chips or sensors that acquire image-related information or otherwise detect movement and/or color without necessarily acquiring an image), alone or in combination with other components (e.g., semiconductor sensors alone or in combination with conventional image acquisition devices or imaging optics).

In certain embodiments, the camera system may include one or more digital video cameras. In one exemplary implementation, any time that imaging-enabled marking device is in motion, at least one digital video camera may be activated and image processing may occur to process information provided by the video camera(s) to facilitate determination of movement and/or orientation of the marking device. In other embodiments, as an alternative to or in addition to one or more digital video cameras, the camera system may include one or more digital still cameras, and/or one or more semiconductor-based sensors or chips (e.g., color sensors, light sensors, optical flow chips) to provide various types of camera system data (e.g., including one or more of image information, non-image information, color information, light level information, motion information, etc.).

Similarly, for purposes of the present disclosure, the term "image analysis software" relates generically to processor-executable instructions that, when executed by one or more processing units (e.g., included as part of control electronics of a marking device, as discussed further below), process image-related and/or color-related data, and in some instances additional information (e.g., relating to a motion of the marking device), to facilitate a determination of one or more of marking device movement, marking device orientation, and marking material color.

As noted above, in the marking device 100 illustrated in FIG. 5A, the one or more camera systems 112 may include any one or more of a variety of components to facilitate acquisition and/or provision of "camera system data" to the control electronics 110 of the marking device 100 (e.g., to be processed by image analysis software 114, discussed further below). The camera system data ultimately provided by camera system(s) 112 generally may include any type of information relating to a surface onto which marking material may be disposed, including information relating to marking material already disposed on the surface, from which information a determination of marking device movement and/or orientation, and/or marking material color, may be made. Accordingly, it should be appreciated that such information constituting camera system data may include, but is not limited to, image information, non-image information, color information, surface type information, and light level information. To this end, the camera system 112 may include any of a variety of conventional cameras (e.g., digital still cameras, digital video cameras), special purpose cameras or other image-acquisition devices (e.g., infra-red cameras), as well as a variety of respective components (e.g., semiconductor chips and/or sensors relating to acquisition of image-related data and/or color-related data), used alone or in combination with each other, to provide information (e.g., camera system data) to be processed by the image analysis software 114.

Figure 5B:
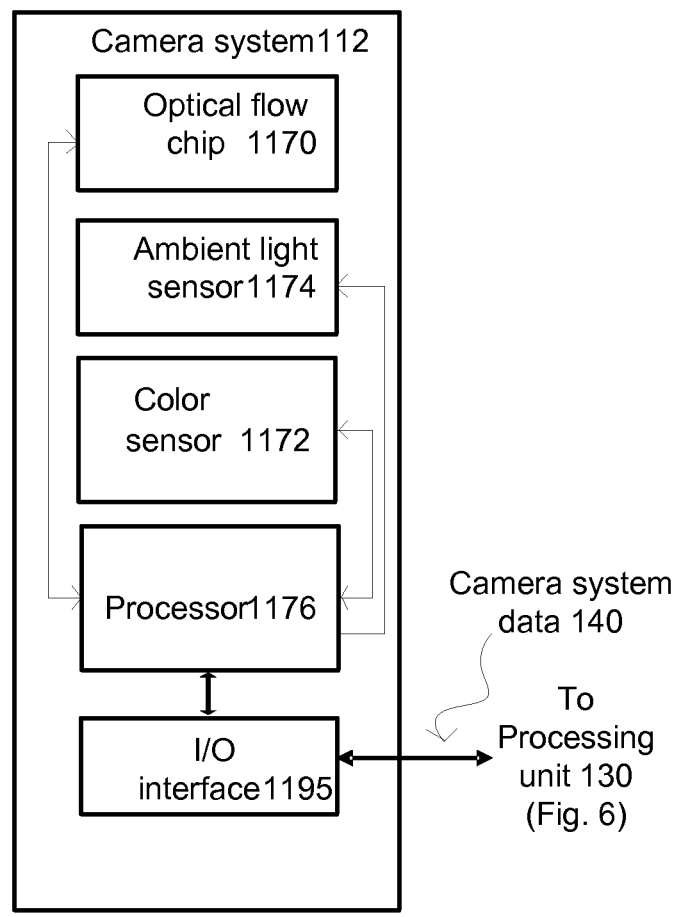
FIG. 5B shows a block diagram of a camera system of the imaging-enabled marking device of FIG. 5A, according to one embodiment of the present disclosure.

FIG. 5B illustrates a block diagram of one example of a camera system 112, according to one embodiment of the present invention. The camera system 112 of this embodiment may include one or more "optical flow chips" 1170, one or more color sensors 1172, one or more ambient light sensors 1174, one or more controllers and/or processors 1176, and one or more input/output (I/O) interfaces 1195 to communicatively couple the camera system 112 to the control electronics 110 of the marking device 100 (e.g., and, more particularly, the processing unit 130, discussed further below). As illustrated in FIG. 5B, each of the optical flow chip(s), the color sensor(s), the ambient light sensor(s), and the I/O interface(s) may be coupled to the controller(s)/processors, wherein the controller(s)/processor(s) are configured to receive information provided by one or more of the optical flow chip(s), the color sensor(s), and the ambient light sensor(s), in some cases process and/or reformat all or part of the received information, and provide all or part of such information, via the I/O interface(s), to the control electronics 110 (e.g., processing unit 130) as camera system data 140. While FIG. 5B illustrates each of an optical flow chip, a color sensor and an ambient light sensor, it should be appreciated that, in other embodiments, each of these components is not necessarily required in a camera system as contemplated according to the concepts disclosed herein. For example, in one embodiment, the camera system may include only an optical flow chip 1170 to provide one or more of color information, image information, and motion information.

In one exemplary implementation of the camera system 112 shown in the embodiment of FIG. 5B, the optical flow chip 1170 includes an image acquisition device and may measure changes in position of the chip (i.e., as mounted on the marking device) by optically acquiring sequential images and mathematically determining the direction and magnitude of movement. Exemplary optical flow chips may acquire images at up to 6400 times per second at a maximum of 1600 counts per inch (cpi), at speeds up to 40 inches per second (ips) and acceleration up to 15 g. The optical flow chip may operate in one of two modes: 1) gray tone mode, in which the images are acquired as gray tone images, and 2) color mode, in which the images are acquired as color images. In some embodiments, the optical flow chip may operate in color mode and obviate the need for a separate color sensor, similarly to various embodiments employing a digital video camera (as discussed in greater detail below). In other embodiments, the optical flow chip may be used to provide information relating to whether the marking device is in motion or not.

Similarly, in one implementation of the camera system 112 shown in FIG. 5B, an exemplary color sensor 1172 may combine a photodiode, color filter, and transimpedance amplifier on a single die. In this example, the output of the color sensor may be in the form of an analog signal and provided to an analog-to-digital converter (e.g., as part of the processor 1176, or as dedicated circuitry not specifically shown in FIG. 5B) to provide one or more digital values representing color. In another example, the color sensor 1172 may be an integrated light-to-frequency converter (LTF) that provides RGB color sensing that is performed by a photodiode grid including 16 groups of 4 elements each. In this example, the output for each color may be a square wave whose frequency is directly proportional to the intensity of the corresponding color. Each group may include a red sensor, a green sensor, a blue sensor, and a clear sensor with no filter. Since the LTF provides a digital output, the color information may be input directly to the processor 1176 by sequentially selecting each color channel, then counting pulses or timing the period to obtain a value. In one embodiment, the values may be sent to processor 1176 and converted to digital values which are provided to the control electronics 110 of the marking device (e.g., the processing unit 130) via I/O interface 1195.

An exemplary ambient light sensor 1174 of the camera system 112 shown in FIG. 5B may include a silicon NPN epitaxial planar phototransistor in a miniature transparent package for surface mounting. The ambient light sensor 1174 may be sensitive to visible light much like the human eye and have peak sensitivity at, e.g., 570 nm. The ambient light sensor provides information relating to relative levels of ambient light in the area targeted by the positioning of the marking device.

An exemplary processor 1176 of the camera system 112 shown in FIG. 5B may include an ARM based microprocessor such as the STM32F103, available from STMicroelectronics (see: http://www.st.corniinternet/mcu/class/1734.jsp), or a PIC 24 processor (for example, PIC24FJ256GA106-I/PT from Microchip Technology Inc. of Chandler, Ariz.). The processor may be configured to receive data from one or more of the optical flow chip(s) 1170, the color sensor(s) 1172, and the ambient light sensor(s) 1174, in some instances process and/or reformat received data, and to communicate with the processing unit 130.

An I/O interface 1195 of the camera system 112 shown in FIG. 5B may be one of various wired or wireless interfaces such as those discussed further below with respect to communications interface 134 of FIG. 6. For example, in one implementation, the I/O interface may include a USB driver and port for providing data from the camera system 112 to processing unit 130.

In one exemplary implementation based on the camera system outlined in FIG. 5B, the one or more optical flow chips may be selected as the ADNS-3080 chip available from Avago Technologies (e.g., see http://www.avagotech.com/pages/en/navigation_interface_devices/navigation sensors/led-based sensors/adns-3080/). The one or more color sensors may be selected as the TAOS TCS3210 sensor available from Texas Advanced Optoelectronic Solutions (TAOS) (see http://www.taosinc.com/). The one or more ambient light sensors may be selected as the Vishay part TEMT6000 (e.g., see http://www.vishay.com/product?docid=81579).

With reference again to FIG. 5A, the camera system 112 may alternatively or additionally include one or more standard digital video cameras. The one or more digital video cameras 112 may be any standard digital video cameras that have a frame rate and resolution that are suitable for use in the imaging-enabled marking device 100. For example, a digital video camera 112 may be a universal serial bus (USB) digital video camera. As a more specific example, a digital video camera 112 may be a Sony PlayStation®Eye video camera that has a 10-inch focal length and is capable of capturing 60 frames/second, where each frame is, for example, 640×480 pixels.

A digital video camera serving as the camera system 112 may be mounted on the imaging-enabled marking device 100 such that marking material dispensed on a target surface may be within some portion of the camera's field of view (FOV). For example, the digital video camera may be placed about 10 to 13 inches from a surface to be marked or traversed, when the marking device is held by a technician during normal use, so that the marking material dispensed on the target surface may be roughly centered horizontally in the camera's FOV and roughly two thirds down from the top of the FOV. In this way, the camera system data captured by the camera system 112 may be used to verify that marking material has been dispensed onto the target surface and/or determine a color of the marking material that has been dispensed.

In some embodiments, a digital output of the one or more camera systems 112 may be stored in any standard or proprietary video file format (e.g., Audio Video Interleave (.AVI) format and QuickTime (.QT) format). For instance, all frames or only certain frames, of the digital output of the one or more camera systems 112 may be stored.

Certain image analysis software 114 may reside at and execute on the control electronics 110 of the imaging-enabled marking device 100. The image analysis software 114 may be any image analysis software for processing digital video output (e.g., from at least one camera system 112). In various embodiments, as noted above, the image analysis software 114 may be configured to process information provided by one or more components such as color sensors, ambient light sensors, and/or optical flow chips/sensors. For example, the image analysis software 114 may include one or more algorithms, such as, but not limited to, an optical flow algorithm, a pattern recognition algorithm, and a color detection algorithm. More details of examples of algorithms that may be implemented in the image analysis software 114 are described with reference to FIGS. 6-14.

The imaging-enabled marking device 100 may include any other devices that may be useful in combination with the camera systems 112 and the image analysis software 114. For example, certain input devices 116 may be integrated into or otherwise connected to the control electronics 110. The input devices 116 may be, for example, any systems, sensors, and/or devices that are useful for acquiring and/or generating data that may be used in combination with the camera systems 112 and the image analysis software 114 for any functionality described in the present disclosure. More details of examples of input devices 116 are described below with reference to FIGS. 6-14.

Various components of the imaging-enabled marking device 100 may be powered by a power source 118. The power source 118 may be any power source that is suitable for use in a portable device, such as, but not limited to, one or more rechargeable batteries, one or more non-rechargeable batteries, a solar electrovoltaic panel, a standard AC power plug feeding an AC-to-DC converter, and the like.

Referring again to FIG. 5A, a marking dispenser 120 (e.g., an aerosol marking paint canister) may be installed in the imaging-enabled marking device 100. Marking material 122 may be dispensed from the marking dispenser 120. Examples of marking materials include, but are not limited to, paint, chalk, dye, and/or marking powder.

In the example shown in FIG. 5A, the camera system 112 is mounted at a portion of the imaging-enabled marking device 100 that is near the marking dispenser 120. This mounting position may be beneficial for two reasons: (1) the motion of the camera system 112 may match the motion of a tip of the imaging-enabled marking device 100 where the marking material 122 is dispersed, and (2) a portion of the marking material 122 that is dispensed onto a target surface may be in the FOV of the camera systems 112.

The camera system 112 may operate in the visible spectrum or in any other suitable spectral range. For example, the camera system 112 may operate in the ultraviolet "UV" (10-400 nm), visible (380-760 nm), near infrared (750-2500 nm), infrared (750-1 mm), microwave (1-1000 mm), various subranges and/or combinations of the foregoing, or other suitable portions of the electromagnetic spectrum.

The camera system 112 may be sensitive to light in a relatively narrow spectral range (e.g., light at wavelength within 10% of a central wavelength, 5% of a central wavelength, 1% of a central wavelength or less). The spectral range may be chosen based on the type of target surface to be marked, for example, to provide improved or maximized contrast or clarity in the images of the surface capture by the camera system 112.

One or more light sources (not shown) may be positioned on the imaging-enabled marking device 100 to illuminate the target surface. The light source may include a lamp, a light emitting diode (LED), a laser, a chemical illumination source, the light source may include optical elements such a focusing lens, a diffuser, a fiber optic, a refractive element, a reflective element, a diffractive element, a filter (e.g., a spectral filter or neutral density filter), etc.

Figure 6:
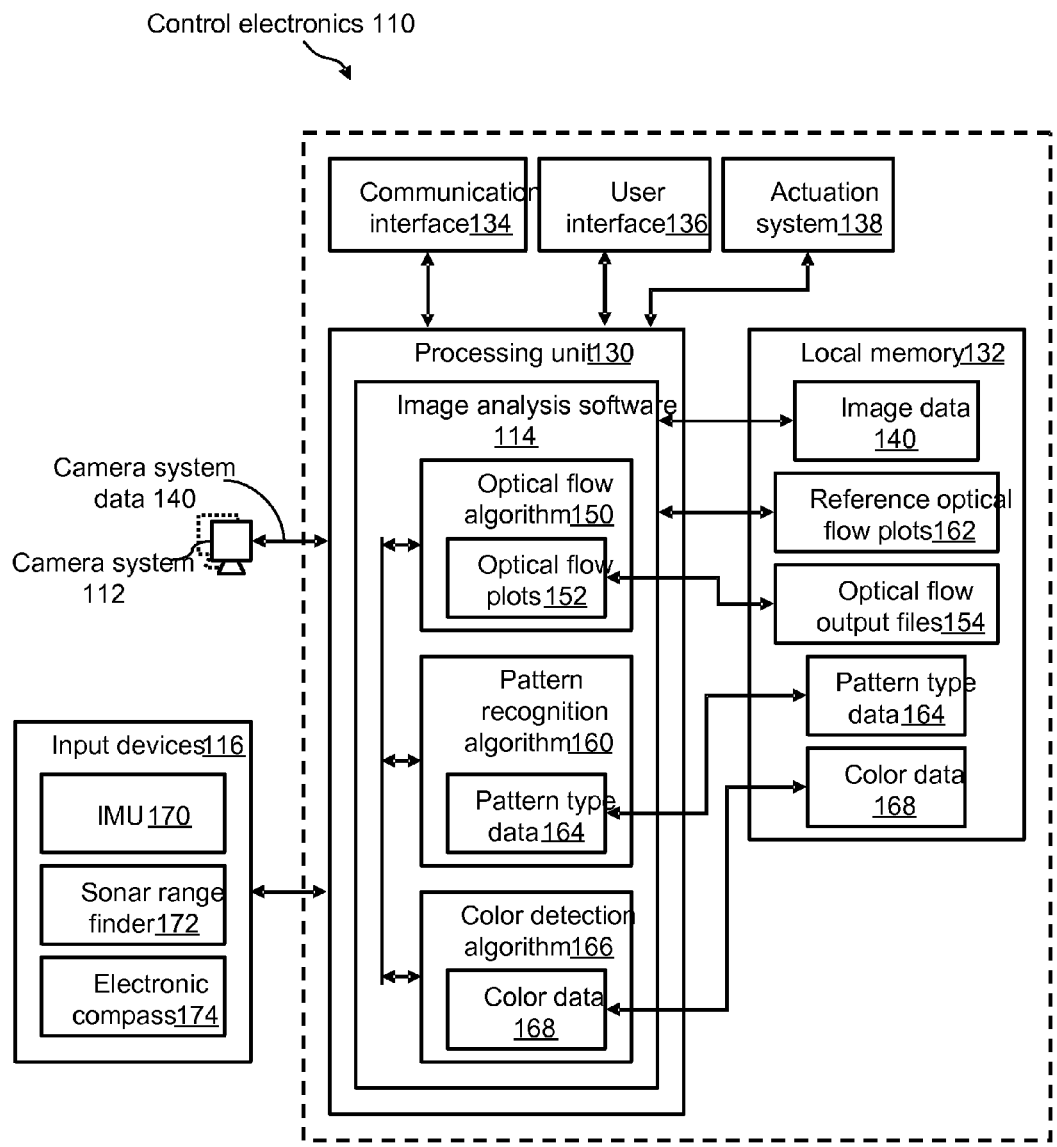
FIG. 6 shows a functional block diagram of an example of control electronics of an imaging-enabled marking device, according to some embodiments of the present disclosure.

Referring to FIG. 6, a functional block diagram of an example of the control electronics 110 of the imaging-enabled marking device 100 of the present disclosure is presented. In this example, the control electronics 110 includes the image analysis software 114 shown in FIG. 5A, a processing unit 130, one or more memories 132, a communication interface 134, a user interface 136, and an actuation system 138. However, it should be appreciated that the control electronics 110 is not limited to these illustrative components, nor to the illustrative configurations shown in FIG. 6.

The image analysis software 114 may be programmed into the processing unit 130. The processing unit 130 may be any general-purpose processor, controller, or microcontroller device that is capable of managing overall operations of the imaging-enabled marking device 100, including managing data that is returned from any component thereof. The one or more memories 132 may be any volatile or non-volatile data storage devices that provide non-transitory storage of data, such as, but not limited to, random access memory (RAM) devices and/or a removable memory devices (e.g., a USB flash drive).

The communication interface 134 may be any wired and/or wireless communication interface for connecting to a network (e.g., a local area network such as an enterprise intranet, a wide area network or the Internet) and by which information (e.g., the contents of the local memories 132) may be exchanged with other devices connected to the network. Examples of wired communication interfaces may be implemented according to various interface protocols, including, but not limited to, a USB protocol, an RS232 protocol, an RS422 protocol, an IEEE 1394 protocol, an Ethernet protocol, an optical protocol (e.g., relating to communications over fiber optics), and any combinations thereof. Examples of wireless communication interfaces may be implemented according to various wireless technologies and/or standards, including, but not limited to, Bluetooth®, ZigBee®, IEEE 802.11, Wi-Fi, Wi-Max, various cellular protocols, Infrared Data Association (IrDA) compatible protocols, Shared Wireless Access Protocol (SWAP), and any combinations thereof.

The user interface 136 may be any mechanism or combination of mechanisms by which a user may operate the imaging-enabled marking device 100 and by which information that is generated by the imaging-enabled marking device 100 may be presented to the user. For example, the user interface 136 may include, but is not limited to, a display, a touch screen, one or more manual pushbuttons, one or more light-emitting diode (LED) indicators, one or more toggle switches, a keypad, an audio output (e.g., speaker, buzzer, and alarm), a wearable interface (e.g., data glove), and any combinations thereof.

The actuation system 138 may include a mechanical and/or electrical actuator mechanism that may be coupled to an actuator that causes the marking material 122 to be dispensed from the marking dispenser 120 of the imaging-enabled marking device 100 (e.g., as shown in FIGS. 3A-B). Actuation refers to starting or causing the imaging-enabled marking device 100 to work, operate, and/or function. Examples of actuation include, but are not limited to, any local, remote, physical, audible, inaudible, visual, non-visual, electronic, electromechanical, biomechanical, biosensing signals, instructions, and events.

Actuations of the imaging-enabled marking device 100 may be performed for any purpose, such as, but not limited to, dispensing the marking material 122 and capturing any information of any component of the imaging-enabled marking device 100 without dispensing marking material. In one example, an actuation may occur by pulling or pressing a physical trigger of the imaging-enabled marking device 100 that causes the marking material 122 to be dispensed.

FIG. 6 also shows the camera system 112 connected to the control electronics 110 of the imaging-enabled marking device 100. In particular, camera system data 140 (e.g., in .AVI and/or .QT file format) of the camera system 112 may be passed (e.g., frame by frame, in the case of video information) to the processing unit 130 and processed by the image analysis software 114. Further, the camera system data 140 may be stored in the one or more memories 132.

FIG. 6 shows that the image analysis software 114 may include one or more algorithms. In one example, the image analysis software 114 may include an optical flow algorithm 150 for processing the camera system data 140 from camera system 112. Optical flow algorithm 150 may be used for performing an optical flow calculation for determining a pattern of apparent motion of camera system 112, which may reflect a pattern of motion of imaging-enabled marking device 100. This pattern of motion may be analyzed to discern or estimate the marking patterns being drawn by the technician using the marking device 100.

In one implementation, the optical flow algorithm 150 may be based on the Pyramidal Lucas-Kanade method for performing optical flow calculations. An optical flow calculation is the process of identifying unique features (or groups of features) that are common to at least two frames of image data (e.g., constituting at least part of the camera system data 140) and, therefore, can be tracked from frame to frame. Having identified such features, the optical flow algorithm 150 may compare the xy position (e.g., in pixels) of the common features in the at least two frames and determine the change (or offset) in xy position from one frame to the next as well as the direction of movement. Then the optical flow algorithm 150 may generate a velocity vector for each common feature, which represents a movement of the feature from the time the first frame is captured to the time the next frame is captured. More details of velocity vectors are described with reference to FIG. 10.

The optical flow algorithm 150 may generate optical flow plots 152 that are based on the velocity vectors that indicate the pattern of apparent motion of imaging-enabled marking device 100. Additionally, the optical flow plots 152 may be tagged with time-stamps that are based on actuation data from the actuation system 138. In this manner, portions of the optical flow plots 152 may be correlated to one or more periods of time when the marking material 122 is dispensed from the imaging-enabled marking device 100. More details of examples of optical flow plots that are generated by an optical flow algorithm are described with reference to FIGS. 9-10.

The raw data representing the optical flow plots 152 and/or the graphical representations of the optical flow plots 152 may be stored in optical flow output files 154 in a local memory 132. More details of an example method of performing the optical flow calculation are described with reference to FIG. 7.

In another example, the image analysis software 114 may include a pattern recognition algorithm 160 for processing the camera system data 140 from the camera system 112. The pattern recognition algorithm 160 may be used for processing the optical flow calculation of the optical flow algorithm 150. For instance, the pattern recognition algorithm 160 may be used to analyze portions (or segments) of the optical flow plots 152 that correspond to dispensing of the marking material 122. These portions may be compared against reference optical flow plots 162 of certain reference marking patterns, which may also be stored in a local memory 132. If and when a suitable match is determined, the pattern recognition algorithm 160 may log the matching pattern type in pattern type data 164. More details of examples of possible marking patterns are described with reference to FIGS. 7A-B. More details of an illustrative method of performing pattern recognition are described with reference to FIG. 11. More details of examples of the reference optical flow plots 162 are described with reference to FIGS. 13A-C.

In yet another example, the image analysis software 114 may include a color detection algorithm 166 for processing the camera system data 140 from the camera system 112. Color detection algorithm 166 may be used for analyzing pixel values (e.g., RGB color, hue, and saturation data) in each frame of camera system data 140 in order to (1) determine whether freshly dispensed marking material is present in the image and, if so, (2) determine a color of the freshly dispensed marking material. Once the color of the marking material is determined, the color detection algorithm 166 may save the color information in color data 168 at a local memory 132. Additional details of an exemplary color detection algorithm 166 may be found in U.S. patent application Ser. No. 13/210,237, filed Aug. 15, 2011, and entitled "Methods, Apparatus and Systems for Marking Material Color Detection in Connection with Locate and Marking Operations," which application is hereby incorporated herein by reference.

FIG. 6 also shows certain input devices 116 connected to the control electronics 110 of the imaging-enabled marking device 100. For example, the input devices 116 may include, but are not limited to, one or more of the following types of devices: an inertial measurement unit (IMU) 170, a sonar range finder 172, and an electronic compass 174.

An IMU is an electronic device that measures and reports an object's acceleration, orientation, and gravitational forces by use of one or more inertial sensors, such as one or more accelerometers, gyroscopes, and compasses. The IMU 170 may be any commercially available IMU device for reporting the acceleration, orientation, and gravitational forces of any device in which it is installed. In one example, the IMU 170 may be an IMU 6 Degrees of Freedom (6DOF) device, available from SparkFun Electronics (Boulder, Colo.). This SparkFun IMU 6DOF device has Bluetooth® capability and provides 3 axes of acceleration data, 3 axes of gyroscopic data, and 3 axes of magnetic data. Readings from the IMU 170 may be a useful input to the processes of the image analysis software 114, as described with reference to the methods of FIGS. 9 and 11.

A sonar (or acoustic) range finder is an instrument for measuring distance from an observer to a target. In one example, the sonar range finder 172 may be a Maxbotix LV-MaxSonar-EZ4 Sonar Range Finder MB1040 from Pololu Corporation (Las Vegas, Nev.), which is a compact sonar range finder that can detect objects from 0 to 6.45 m (21.2 ft) with a resolution of 2.5 cm (1") for distances beyond 15 cm (6"). The sonar range finder 172 may be mounted in about the same plane as the FOV of the camera system 112, so that the sonar range finder 172 may measure the distance between the camera system 112 and a target surface being marked. This distance measurement may be provided as a distance parameter input to image analysis software 114, which may be useful for accurately processing the camera system data 140, as described with reference to the methods of FIGS. 9 and 11.

The electronic compass 174 may be any commercially available electronic compass for providing a directional heading of any device in which it is installed. The directional heading may indicate the direction towards which the electronic compass 174 is moving, such as north, south, east, west, and any direction in between. Readings from the electronic compass 174 may be a useful input to the processes of the image analysis software 114, as described with reference to the methods of FIGS. 9 and 11. For example, the electronic compass 174 may be used to determine a heading parameter for the imaging-enabled marking device 100, which may be useful for the image analysis software 114 for determining an orientation of marking patterns.

In some embodiments, the imaging-enabled marking device 100 may include at least two digital video cameras constituting at least part of the camera system 112, that are mounted in any useful configuration. For example, two digital video cameras of the camera system 112 may be mounted side-by-side, one behind the other, in the same vertical plane, or not in the same vertical plane. The FOVs of the two digital video cameras may overlap to any suitable extent (e.g., 5%, 10%, or 15%), so as to provide some common point of reference. In one example, information from these two video cameras may be useful to the image analysis software 114 for providing more features of interest to process when determining patterns that are dispensed by the imaging-enabled marking device 100.

In another example, in place of or in combination with the sonar range finder 172, the two digital video cameras may be used to perform a range finding function, for example, to determine the distance between one of the video cameras and the target surface to be marked. For instance, the two digital video cameras may be used to perform a stereoscopic (or stereo vision) range finder function, which is well known. For range finding, the two digital video cameras may be placed some distance apart so that the respective FOVs may have a desired percent overlap (e.g., 50%-66% overlap). In this scenario, the two digital video cameras may or may not be mounted in the same plane.

In yet another example, one camera system 112 may be mounted in a higher plane than another camera system 112 with respect to the target surface. A benefit of this configuration is that the higher camera system 112 may have a larger FOV for capturing more information about the surrounding environment. That is, the higher camera system 112 may capture features that are not captured by the lower camera system 112, which may have a smaller FOV. For example, the higher camera system 112 may capture the presence of a curb nearby or other markings nearby, which may provide additional context information regarding the marking operation. In another example, the higher camera system 112 may have a lower frame rate, such as 15 frames/second, but higher resolution, while the lower camera system 112 may have a higher frame rate, such as 60 frames/second, but lower resolution. In this configuration, the range finding function may occur at a frame rate of 15 frames/second, while the optical flow calculation may occur at the frame rate of 60 frames/second.

Figure 7A:
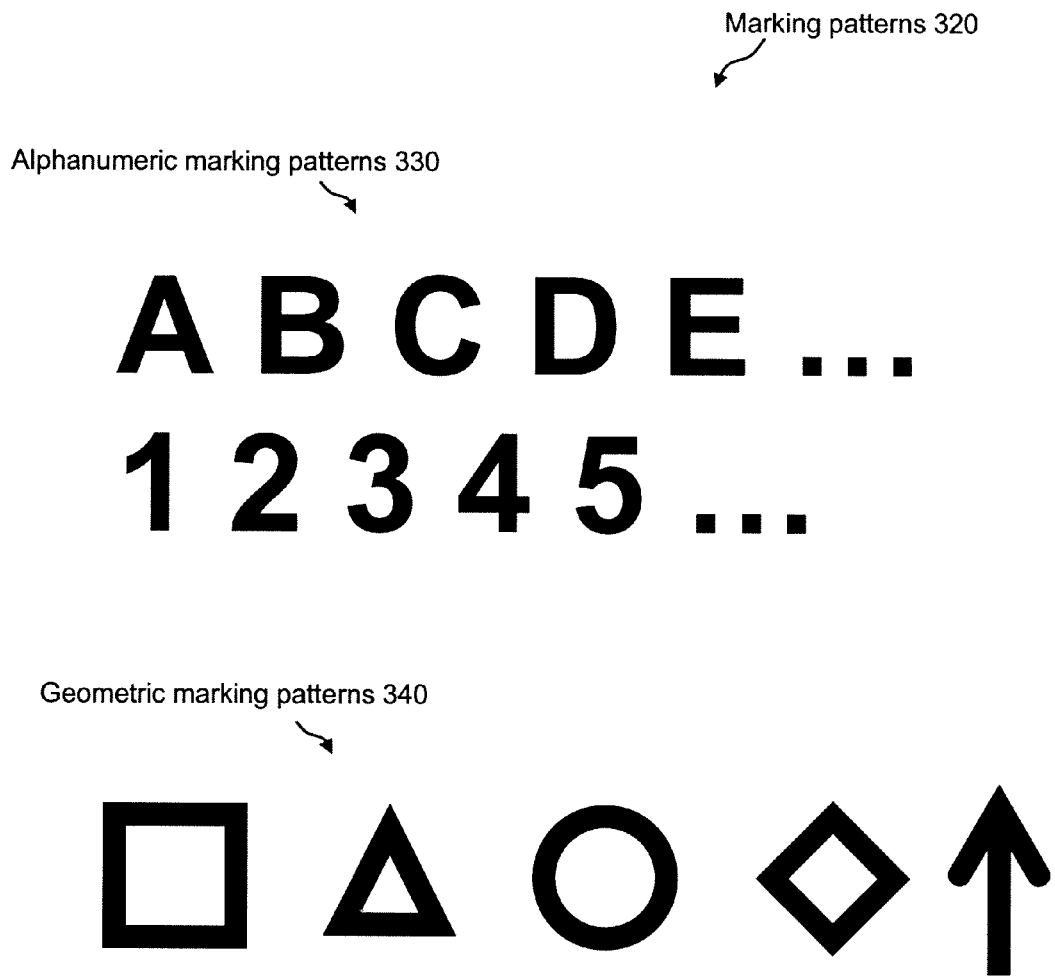
FIG. 7A shows examples of marking patterns that may be dispensed by imaging-enabled marking device and detected using the camera system and image analysis software thereof, according some embodiments of the present disclosure.

Referring to FIG. 7A, examples of marking patterns 320 that may be dispensed by the imaging-enabled marking device 100 and detected using the camera system and image analysis software thereof are presented.

Examples of the marking patterns 320 include alphanumeric marking patterns 330, which may be any characters, such as letters and numbers. Other examples of the marking patterns 320 include geometric marking patterns 340, which may be any geometric symbols, shapes, and/or characters, such as, but not limited to, lines, squares, rectangles, circles, triangles, diamonds, and arrows. Yet other examples of the marking patterns 320 include any combinations of two or more alphanumeric marking patterns 330, any combinations of two or more geometric marking patterns 340, and any combinations of one or more alphanumeric marking patterns 330 and one or more geometric marking patterns 340.

Figure 7B:
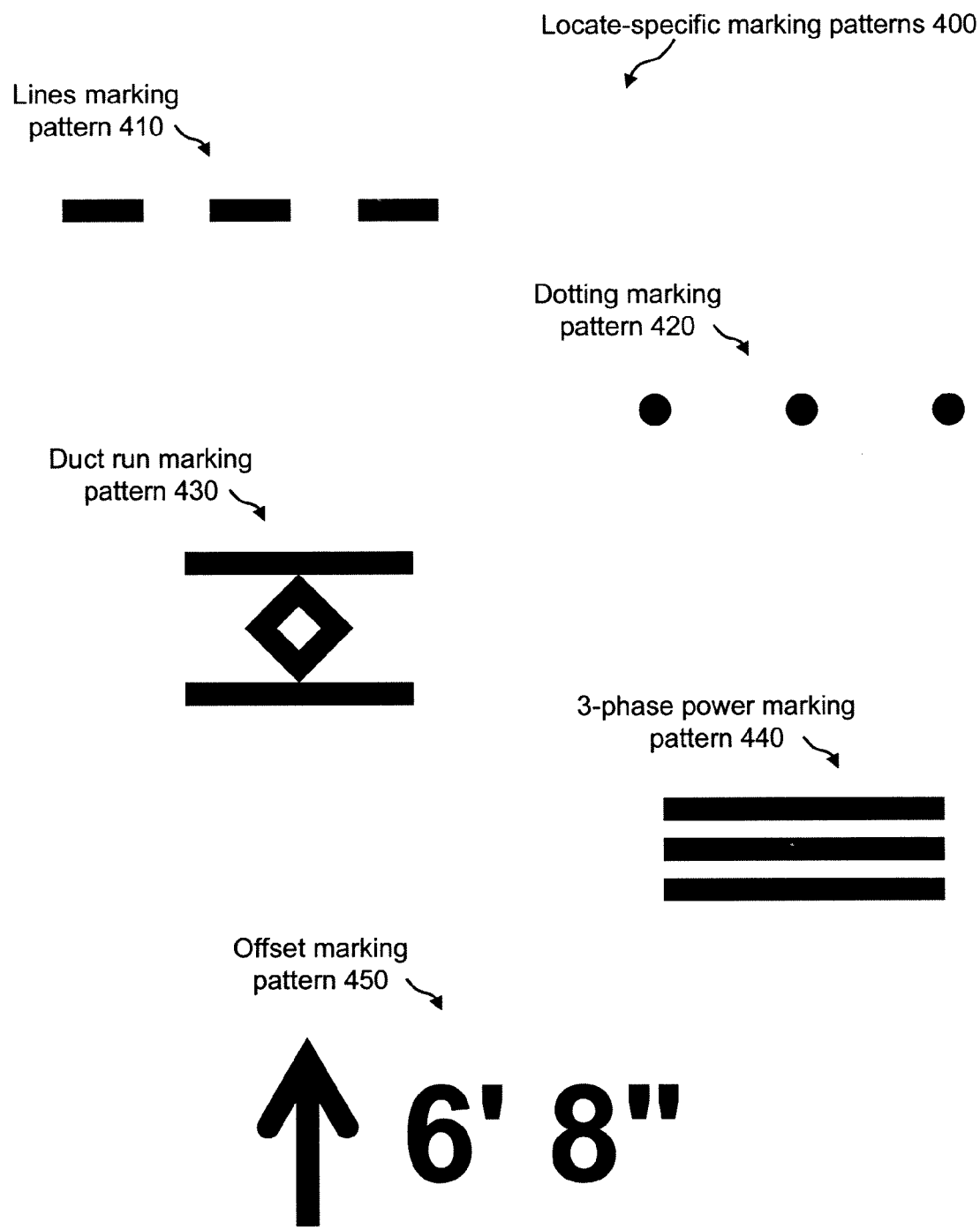
FIG. 7B shows other examples of marking patterns that may be dispensed by imaging-enabled marking device and detected using the camera system and image analysis software thereof, according to some embodiments of the present disclosure.

Referring to FIG. 7B, examples of locate-specific marking patterns 400 are presented. An example of a locate-specific marking pattern 400 is a lines marking pattern 410. Another example of a locate-specific marking pattern 400 is a dotting marking pattern 420. Other examples of a locate-specific marking pattern 400 may use combinations of geometric marking patterns 340, such as a duct run marking pattern 430 that includes a diamond shape between two lines. Another example of a locate-specific marking pattern 400 that uses a combination of geometric marking patterns 340 is a 3-phase power marking pattern 440 that includes three parallel lines. An example of a locate-specific marking pattern 400 that uses a combination of alphanumeric marking patterns 330 and geometric marking patterns 340 is an offset marking pattern 450 that includes an arrow and a measurement in feet and inches (e.g., ↑6' 8").

It should be appreciated that the inventive concepts of the present disclosure are not limited to the examples of marking patterns and locate-specific marking patterns shown in FIGS. 7A-B. These marking patterns are exemplary only, and other patterns may also be useful in performing various types of marking operations.

Figure 8A:
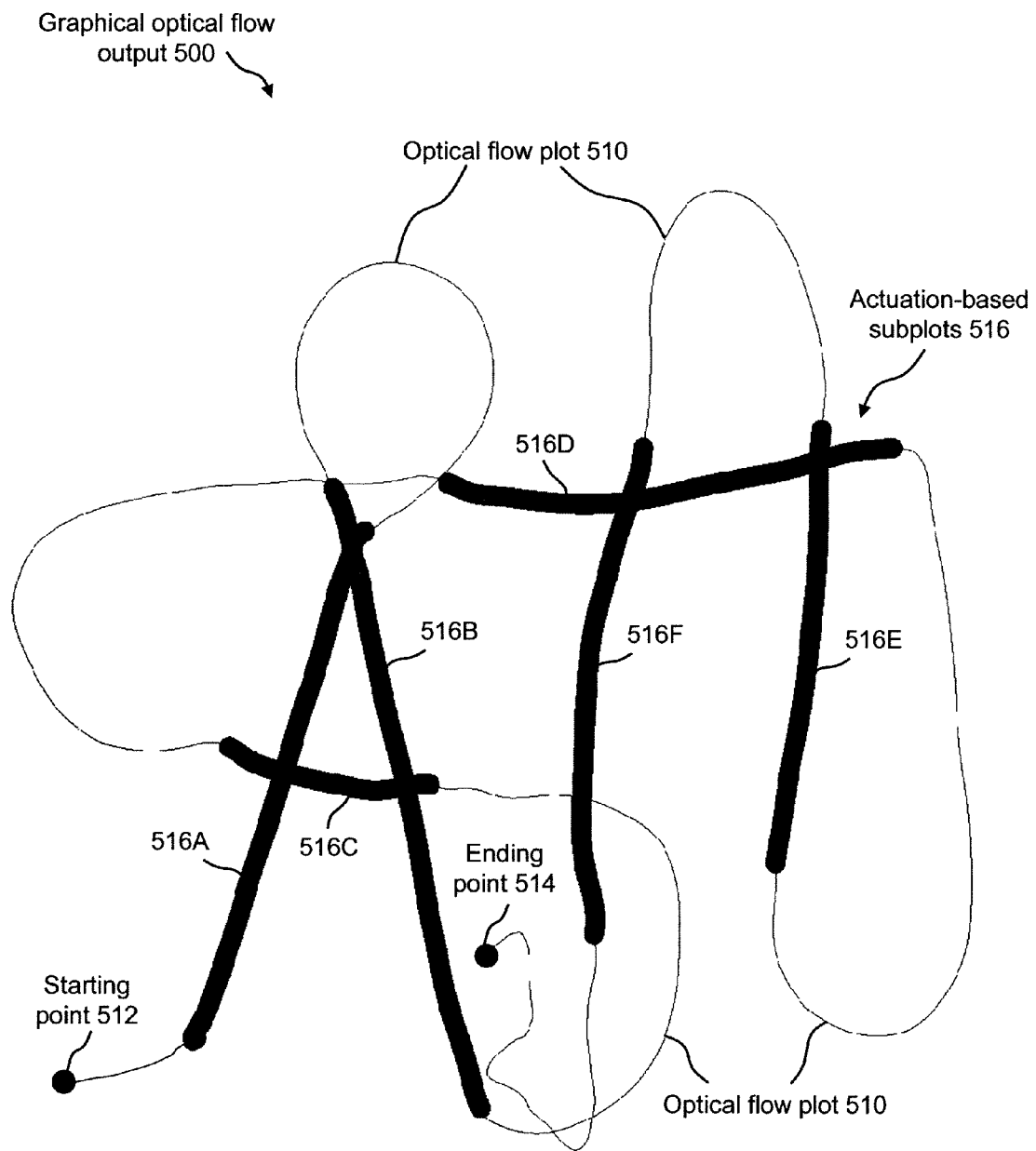
FIG. 8A shows an example of a graphical optical flow output, which is a graphical representation of an optical flow plot of a marking pattern that includes the characters "ATT," according to some embodiments of the present disclosure.

Referring to FIG. 8A, an example of a graphical optical flow output 500 is presented. In this example, the graphical optical flow output 500 includes an graphical representation of an optical flow plot 152 of a marking pattern having the characters "ATT". The graphical optical flow output 500 depicts an optical flow plot 510 that has a starting point 512 and an ending point 514. The optical flow plot 510, which is an example of an optical flow plot 152, may be generated from the optical flow calculations of the optical flow algorithm 150. Thus, the optical flow plot 510 may indicate the pattern of apparent motion (i.e., physical path) of a source camera system 112 between the starting point 512 and the ending point 514. The optical flow plot 510 may be generated from a video stream captured by a certain camera system 112, where the starting point 512 corresponds to a starting frame of the camera system data 140 and the ending point 514 corresponds to an ending frame of the camera system data 140.

The graphical optical flow output 500 also depicts certain actuation-based subplots 516A-F that are overlaid upon certain portions or segments of the larger optical flow plot 510. For example, the actuation-based subplots 516A-F may be presented as bold lines while the optical flow plot 510 in its entirety may be presented as a thin line. The starting and ending points of each actuation-based subplot 516A-F may be based on timestamp data from the actuation system 138. For example, the starting point of each actuation-based subplot 516 may be based on a "begin actuation" timestamp from the actuation system 138. Likewise, the ending point of each actuation-based subplot 516 is based on an "end actuation" timestamp from the actuation system 138.

During normal operation of the imaging-enabled marking device 100, marking material 122 may be dispensed with each actuation of the imaging-enabled marking device 100, so that each actuation-based subplot may correspond to a pattern of the marking material 122 being dispensed. That is, each actuation-based subplot may represent a dispensing event of the imaging-enabled marking device 100. For example, and referring again to FIG. 8A, actuation-based subplots 516A-F may represent six actuations (e.g., six dispensing events), in order of occurrence, along the optical flow plot 510 to indicate an "ATT" marking pattern. More specifically, actuation-based subplots 516-C may include the letter "A" marking pattern, while actuation-based subplots 516D-F may include the letters "TT" marking pattern. Viewing all subplots together, one can observe the "ATT" marking pattern in the graphical optical flow output 500.

Figure 8B:
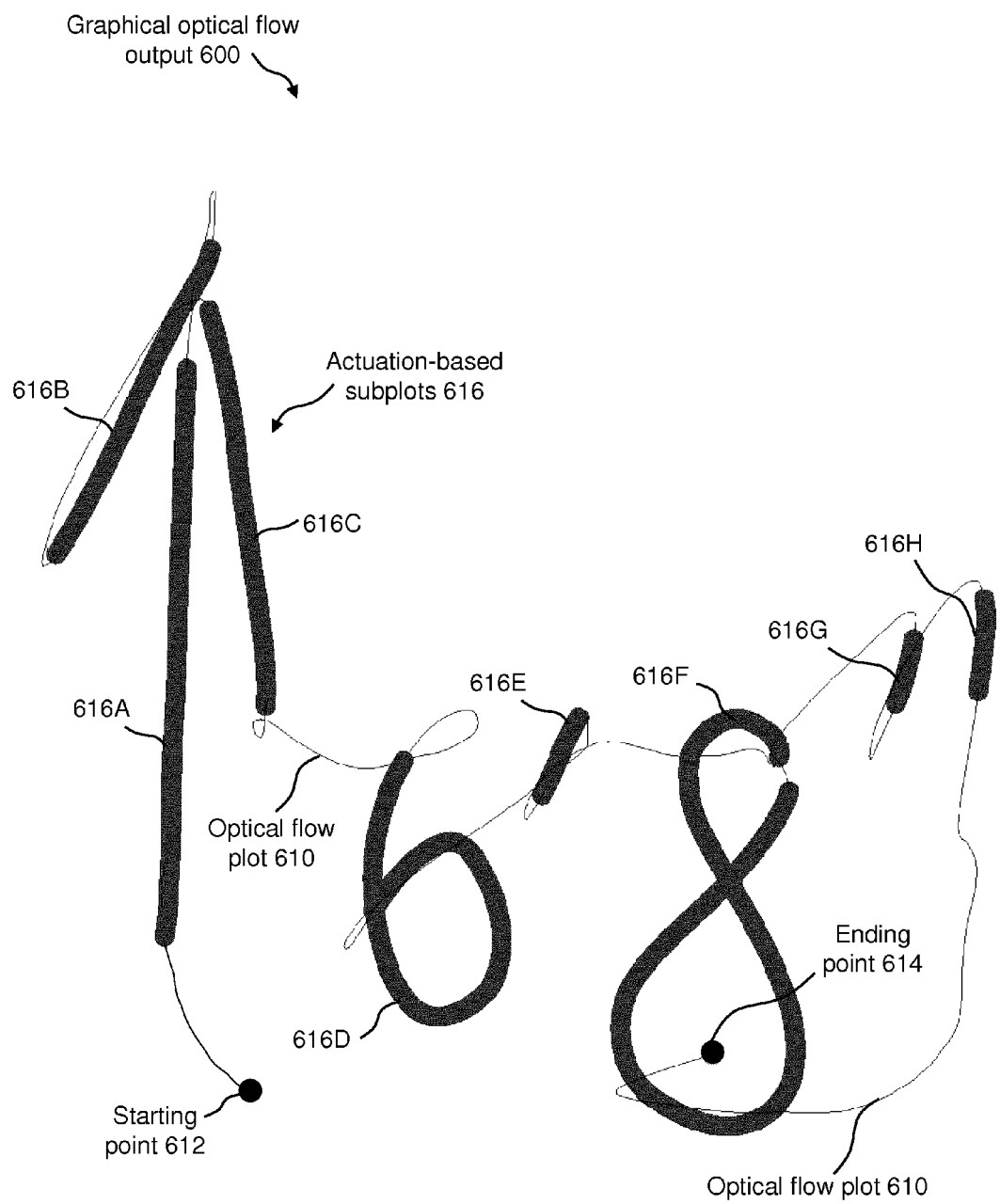
FIG. 8B shows another example of a graphical optical flow output, which is a graphical representation of an optical flow plot of an "offset marking pattern" of FIG. 4, according to some embodiments of the present disclosure.

Referring to FIG. 8B, another example of a graphical optical flow output 600 is presented. In this example, the graphical optical flow output 600 is a graphical representation of an optical flow plot 152 of the offset marking pattern 450 of FIG. 7B, having an arrow and a measurement in feet and inches (e.g., ↑6'8"). The graphical optical flow output 600 depicts an optical flow plot 610 that has a starting point 612 and an ending point 614. The optical flow plot 610 is an example of an optical flow plot 152 that is generated by the optical flow algorithm 150. Like the optical flow plot 510 of FIG. 8A, the optical flow plot 610 may be generated from a video stream captured by a certain camera system 112, where a starting point 612 corresponds to a starting frame of the camera system data 140 and an ending point 614 corresponds to an ending frame of camera system data 140.

In the example of FIG. 8B, the graphical optical flow output 600 depicts certain actuation-based subplots 616A-H that are overlaid upon certain portions or segments of the larger optical flow plot 610. Again, the starting and ending points of each actuation-based subplot may be based on timestamp data from actuation system 138 and, each actuation-based subplot may represent a dispensing event of the imaging-enabled marking device 100. In this example, the actuation-based subplots 616A-H may represent eight actuations (e.g., eight dispensing events), in temporal order of occurrence, along the optical flow plot 610 to manifest a "↑6'8"" marking pattern, which is an example of an "offset marking pattern." For instance, the actuation-based subplots 616A-C may manifest an arrow marking pattern, the actuation-based subplot 616D may manifest a numeral "6," the actuation-based subplot 616E may manifest a symbol for feet, the actuation-based subplot 616F may manifest a numeral "8," and the actuation-based subplots 616G-H may manifest the symbol for inches. Viewing all subplots together, one can observe the "↑6'8"" marking pattern in the graphical optical flow output 600.

Referring again to FIGS. 8A-B, the camera system 112 and any operations of the image analysis software 114 may be triggered only when it is sensed that the imaging-enabled marking device 100 is in motion. In one example, only when readings from the IMU 170 indicate that the imaging-enabled marking device 100 is in motion is one or more camera system 112 activated. In this scenario, the starting and ending points of the optical flow plots, such as the optical flow plot 510 of FIG. 8A and the optical flow plot 610 of FIG. 8B, may be a function of readings from the IMU 170.

In alternative embodiments, the imaging-enabled marking device may receive camera system data on an ongoing basis, without regard to whether or not the imaging-enabled marking device is in motion. For example, in embodiments where an optical flow chip is used in the camera system instead of digital video cameras, the camera system may draw less power, making it practical to operate the camera system continuously.

Referring yet again to FIGS. 8A-B, the optical flow algorithm 150 may correlate timestamps from actuation system 138 to points in time along the optical flow plots generated therewith. In this way, certain subplots are identified that may indicate marking patterns that are dispensed using imaging-enabled marking device 100. Graphical optical flow output 500 and graphical optical flow output 600 are examples of electronic graphical representations of the process that is performed by optical flow algorithm 150. Further, the allowable maximum rate of movement for allowing the operations of optical flow algorithm 150 is a function of the resolution and frame rate of the source camera system 112. More details of an example of a method of using optical flow algorithm 150 to generate optical flow plots and actuation-based subplots are described with reference to FIG. 9.

Figure 9:
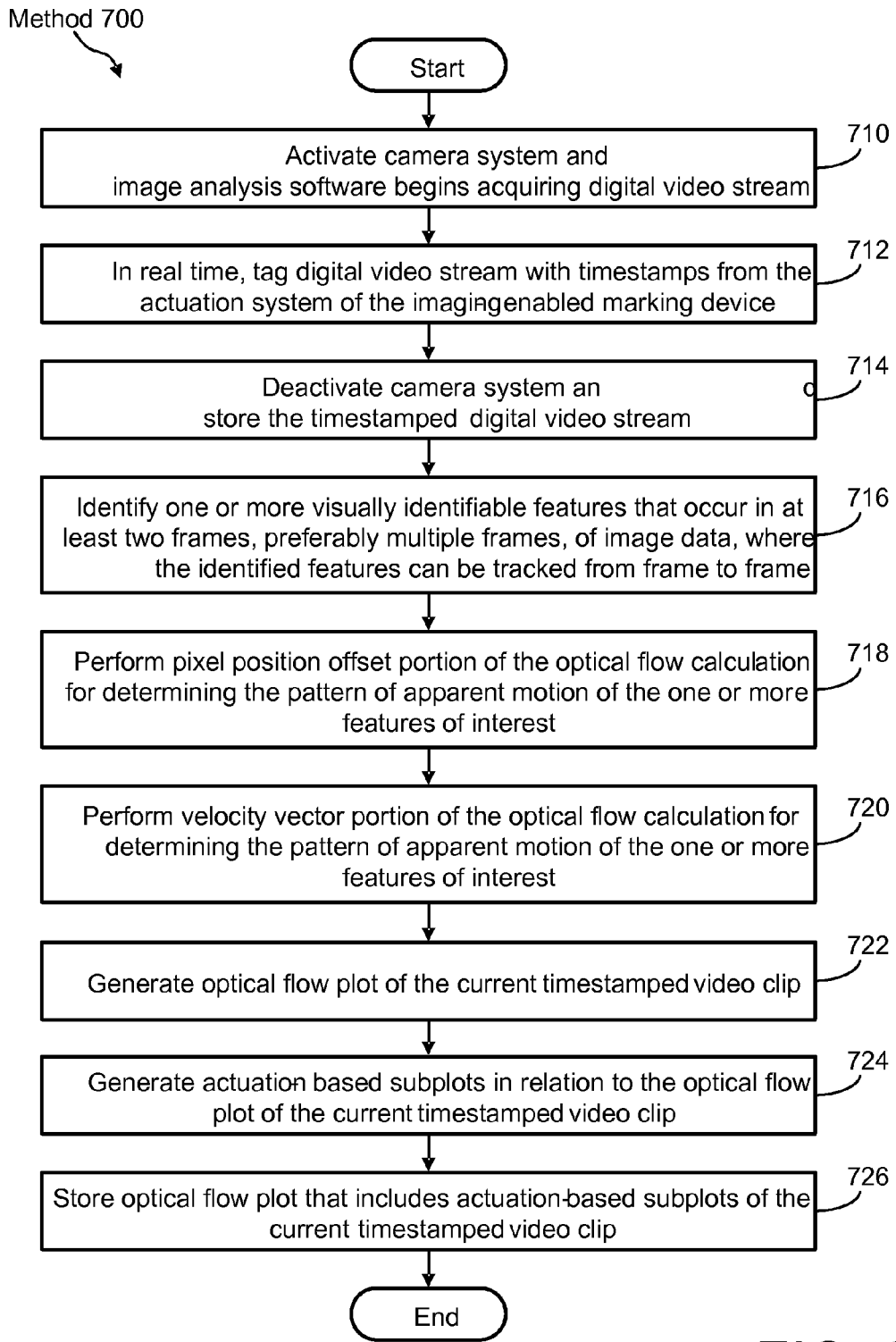
FIG. 9 shows a flow diagram of an example of a method of using an optical flow algorithm of the imaging-enabled marking device to generate optical flow plots and actuation-based subplots, according to some embodiments of the present disclosure.

Referring to FIG. 9, a flow diagram of an example of a method 700 of using optical flow algorithm 150 to generate optical flow plots and actuation-based subplots is presented. Method 700 may include, but is not limited to, the following steps, which are not limited to any order.

At step 710, one or more camera systems 112 is activated by any means, such as, but not limited to, manually by the user, automatically by programming, and/or automatically by sensing movement of imaging-enabled marking device 100. Upon activation of the at least one camera system 112, image analysis software 114 begins acquiring the digital video stream (e.g., camera system data 140) therefrom.

At step 712, the digital video stream (e.g., camera system data 140) is tagged in real time with timestamps from actuation system 138. For example, certain frames of camera system data 140 are tagged in real time with "begin actuation" timestamps from actuation system 138 and certain other frames of camera system data 140 are tagged in real time with "end actuation" timestamps.

At step 714, the at least one camera system 112 is deactivated by any means, such as, but not limited to, manually by the user, automatically by programming, and/or automatically by sensing the lack of movement of imaging-enabled marking device 100. Upon deactivation of the at least one camera system 112, camera system data 140 that is tagged with timestamps from actuation system 138 is stored at local memory 132. In one example, a few seconds of timestamped video is stored in camera system data 140 at local memory 132.

At step 716, by processing camera system data 140 frame by frame, optical flow algorithm 150 identifies one or more visually identifiable features (or groups of features) in any frames of camera system data 140. In particular, an aspect of these visually identifiable features is that they occur in at least two frames, preferably multiple frames, of camera system data 140 and, therefore, can be tracked through at least two frames, preferably multiple frames, of camera system data 140. A visually identifiable feature may be represented, for example, by a specific pattern of repeatably identifiable pixel values; pixel values meaning RGB color, hue, and saturation data.

At step 718, the pixel position offset portion of the optical flow calculation is performed for determining the pattern of apparent motion of the one or more visually identifiable features (or groups of features) that are identified in step 716. In one example, the optical flow calculation that is performed by optical flow algorithm 150 is based on the Pyramidal Lucas-Kanade method for performing the optical flow calculation. In the optical flow calculation, for each frame of camera system data 140, optical flow algorithm 150 determines and logs the xy position (in pixels) of the features of interest. Optical flow algorithm 150 then determines the change or offset in the xy positions of the features of interest from frame to frame. For example, the change in xy position of a certain frame relative to the previous frame may be 75 pixels left and 50 pixels down. Using distance information from sonar range finder 172 (i.e., height of camera from target surface), optical flow algorithm 150 correlates the number of pixels offset to an actual distance measurement (e.g., 100 pixels=1 cm). A lookup table (not shown) for correlating distance to, for example, pixels/cm or pixels/inch may be used. Relative to the FOV of the source camera system 112, optical flow algorithm 150 then determines the direction of movement of the features of interest.

In another embodiment, instead of readings from sonar range finder 172 feeding a dynamic distance parameter of optical flow algorithm 150, the distance parameter may be a fixed value stored in local memory 132. In yet another embodiment, instead of sonar range finder 172, two camera systems 112 may be used to determine the distance between camera systems 112 and the target surface to be marked. More specifically, two camera systems 112 may be used to perform a stereoscopic (or stereo vision) range finder function, which is well known.

At step 720, the velocity vector portion of the optical flow calculation is performed for determining the pattern of apparent motion of the one or more visually identifiable features (or groups of features) that are identified in step 716. For example, using the pixel offsets and direction of movement of each feature of interest from step 718, optical flow algorithm 150 generates a velocity vector for each feature that is being tracked from one frame to the next frame. The velocity vector represents the movement of the feature from one frame to the next frame. Optical flow algorithm 150 then generates an average velocity vector, which is the average of the individual velocity vectors of all features of interest that have been identified. More details of an example of velocity vectors and an average velocity vector that is generated by optical flow algorithm 150 are described with reference to FIG. 10.

At step 722, using the calculations of steps 718 and 720, optical flow algorithm 150 generates an optical flow plot 152 of the current timestamped video clip. For example, optical flow algorithm 150 generates an optical flow plot 152, such as, but not limited to, optical flow plot 510 of FIG. 8A and optical flow plot 610 of FIG. 8B.

At step 724, optical flow algorithm 150 processes the actuation-based timestamps of the current video clip and generates and the actuation-based subplots in relation to the optical flow plot. In one example and referring again to FIG. 8A, optical flow algorithm 150 generates actuation-based subplots 516 in relation to optical flow plot 510. In another example and referring again to FIG. 8B, optical flow algorithm 150 generates actuation-based subplots 616 in relation to optical flow plot 610.

At step 726, for the current timestamped video clip, optical flow algorithm 150 stores the resulting optical flow plot 152 that includes the actuation-based subplots. In one example, the raw data of the resulting optical flow plot 152 and/or the graphical representation of the resulting optical flow plot 152 may be stored in optical flow output files 154 in local memory 132. Any output of optical flow algorithm 150 may be used as the input to the marking pattern recognition process of the present disclosure, such as the marking pattern recognition process that is described with reference to FIG. 11.

Referring again to method 700 of FIG. 9, during marking operations, apparent motion of objects may be detected in the FOV of camera system 112 that is not the result of imaging-enabled marking device 100 moving. For example, an insect, a bird, an animal, a blowing leaf may briefly pass through the FOV of camera system 112. However, optical flow algorithm 150 may assume that any movement detected is implying motion of imaging-enabled marking device 100. Therefore, throughout the steps of method 700 it may be beneficial for optical flow algorithm 150 to monitor readings from IMU 170 in order to ensure that the apparent motion detected is actually the result of imaging-enabled marking device 100 moving, and not anomalous pixel movement due to an object passing briefly through the camera's FOV. That is, optical flow algorithm 150 may use readings from IMU 170 to avoid performing optical flow calculations on any bogus apparent motion that may be detected, i.e., readings from IMU 170 are used to support a filter function.

Figure 10:
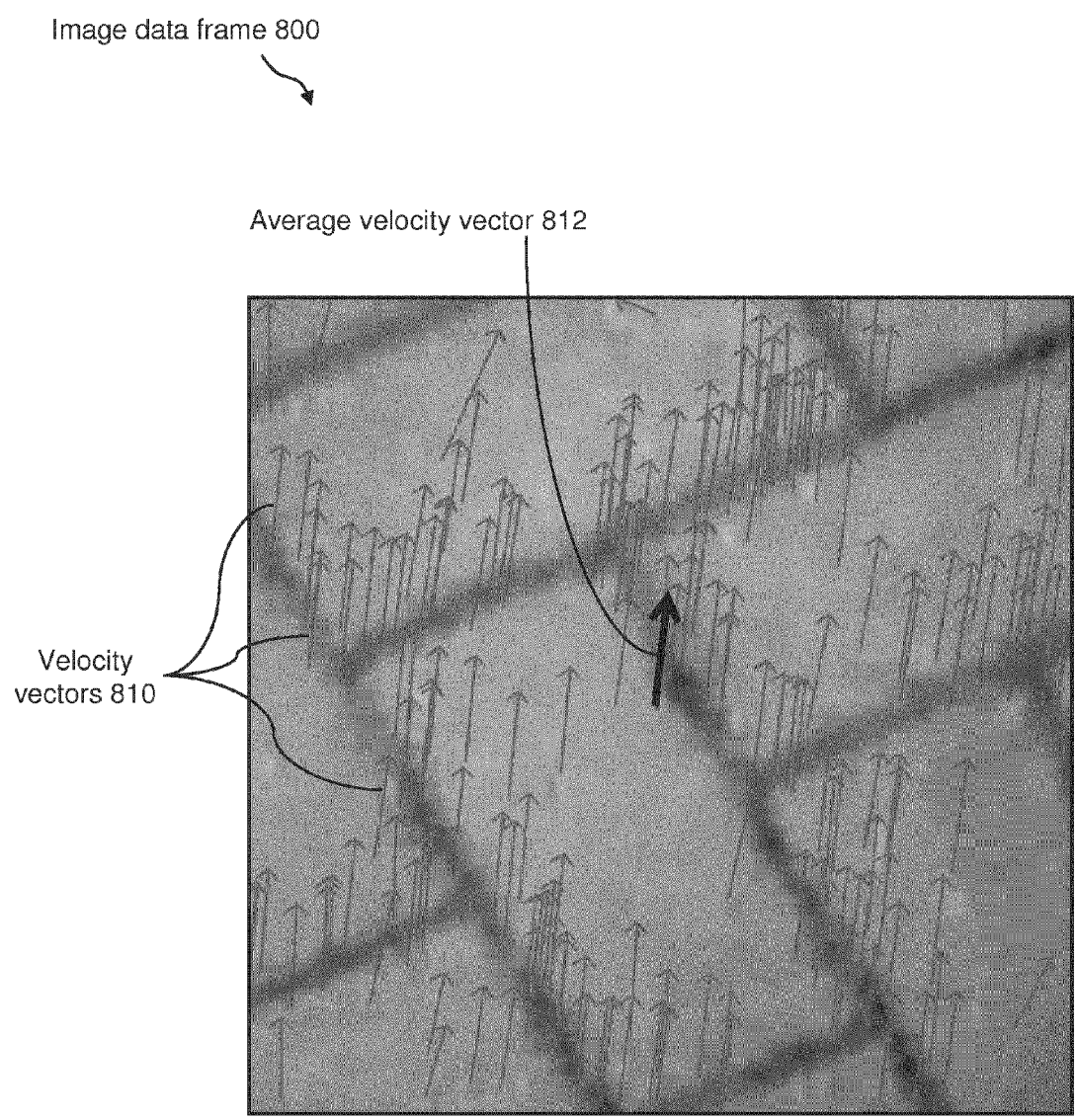
FIG. 10 shows a view of an example of a frame of camera system data that shows velocity vectors overlaid thereon that indicate the apparent motion of the imaging-enabled marking device, according to some embodiments of the present disclosure.

Referring to FIG. 10, a view of an example of a frame of camera system data 140 is presented that shows velocity vectors overlaid thereon that indicate the apparent motion of imaging-enabled marking device 100. More specifically, FIG. 10 shows an image data frame 800 that has velocity vectors 810 overlaid thereon, which is an example of the output of step 720 of method 700. Image data frame 800 is, for example, one frame of camera system data 140 from a certain camera system 112. This particular frame of camera system data 140 shows imagery of a brick pattern, which is an example of a type of surface being marked by imaging-enabled marking device 100.

In this example, the visually identifiable features (or groups of features) that are identified by optical flow algorithm 150 in step 716 of method 700 are the lines between the bricks. Therefore, in this example the positions of velocity vectors 810 substantially track with the positions of the lines between the bricks. Velocity vectors 810 show the apparent motion of the lines between the bricks from this frame of camera system data 140 to the next frame (not shown), meaning velocity vectors 810 show the apparent motion between two sequential frames. Velocity vectors 810 are indicated by arrows, where direction of motion is indicated by the direction of the arrow and the length of the arrow indicates the distance moved. Generally, a velocity vector represents the velocity of an object plus the direction of motion. In this scenario, velocity vectors 810 can be expressed as pixels/frame, knowing that the frame to frame time depends on the frame rate of the camera system 112. Further, in this scenario the direction can be expressed as the number of pixels offset from frame to frame.

FIG. 10 also shows an average velocity vector 812 overlaid atop image data frame 800. Average velocity vector 812 represents the average of all velocity vectors 810.

Referring to FIGS. 5-10, in one embodiment of the disclosure, graphical optical flow outputs, such as graphical optical flow output 500 of FIG. 8A and graphical optical flow output 600 of FIG. 8B, may be stored in optical flow output files 154, which are further stored in the electronic records of locate operations. In this scenario, the types of patterns marked may be determined by human visualization. That is, a person opens the graphical optical flow output using an image viewer of his/her computer and manually observes the marking pattern indicated therein. However, in a preferred embodiment, the types of marking patterns are determined by automated means, such as by use of pattern recognition algorithm 160 as described with reference to FIG. 11 below.

Figure 11:
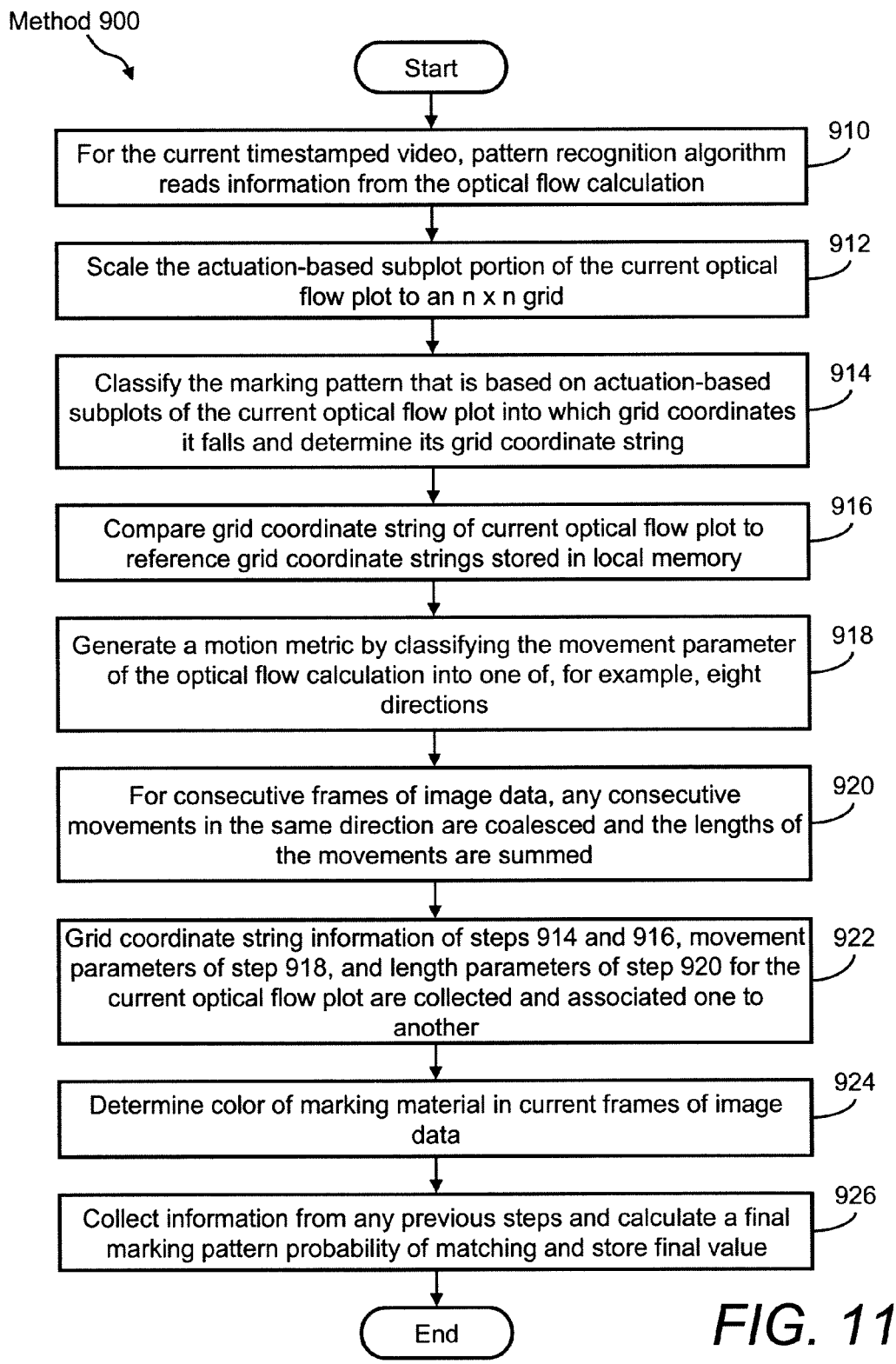
FIG. 11 shows a flow diagram of an example of a method of performing a marking pattern recognition process using the image analysis software of the imaging-enabled marking device, according to some embodiments of the present disclosure.

Referring to FIG. 11, a flow diagram of an example of a method 900 of performing a marking pattern recognition process using the image analysis software of imaging-enabled marking device 100 is presented. Method 900 may include, but is not limited to, the following steps, which are not limited to any order.

At step 910, for the current timestamped video, pattern recognition algorithm 160 reads information from the optical flow calculation of optical flow algorithm 150 that is described, for example, in method 700 of FIG. 9. For example, for the current timestamped video, pattern recognition algorithm 160 reads in the optical flow plot 152 that includes the actuation-based subplots and/or the raw data associated therewith. In one example, pattern recognition algorithm 160 reads in optical flow plot 510 of FIG. 8A that includes actuation-based subplots 516. In another example, pattern recognition algorithm 160 reads in optical flow plot 610 of FIG. 8B that includes actuation-based subplots 616. Additionally, pattern recognition algorithm 160 may read in the raw pixel position offset information, the raw direction information, and the raw velocity vector information generated by optical flow algorithm 150 in method 700 of FIG. 9.

At step 912, pattern recognition algorithm 160 scales the actuation-based subplot portion of the optical flow plot 152 to an n×n grid, such as a 3×3 grid. In one example, the actuation-based subplots 516 indicating the ATT marking pattern atop optical flow plot 510 of FIG. 8A is scaled to an n×n grid. In another example, the actuation-based subplots 616 indicating the ↑ 6'8" marking pattern atop optical flow plot 610 of FIG. 8B is scaled to an n×n grid. Pattern recognition algorithm 160 scales the marking pattern to fit the grid no matter how big or small the marking pattern. To illustrate, FIGS. 12A-C show examples of sample marking patterns that are scaled to fit a 3×3 grid.

Figure 12A:
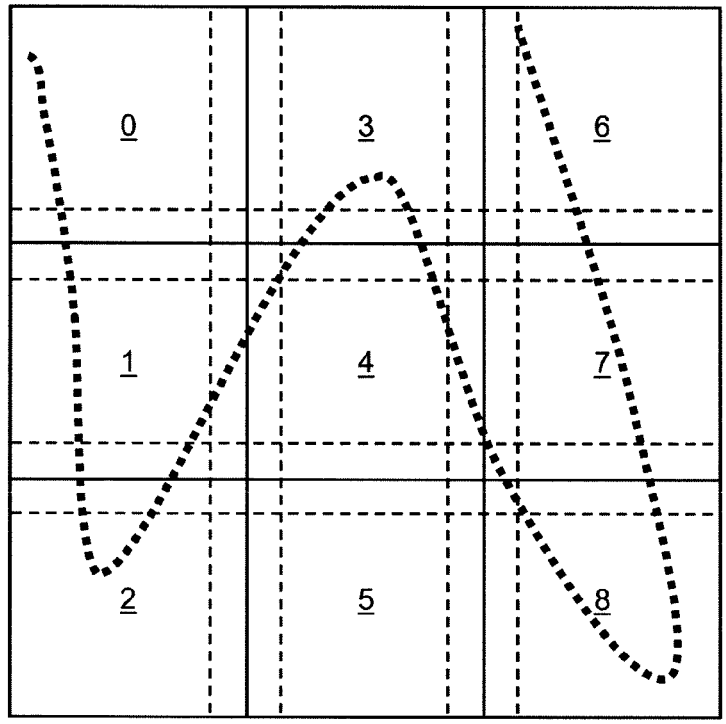
FIG. 12A shows a sample "W" optical flow plot, which is an example of a "W" marking pattern that is based on actuation-based subplots of the optical flow calculation, according to the present disclosure.

Referring to FIG. 12A, a sample "W" optical flow plot 1000 is presented, which is an example of a "W" marking pattern that is based on actuation-based subplots of the optical flow calculation of method 700 of FIG. 9 and fitted to a 3×3 grid, the boxes of which are numbered 0 to 8 as shown.

Figure 12B:
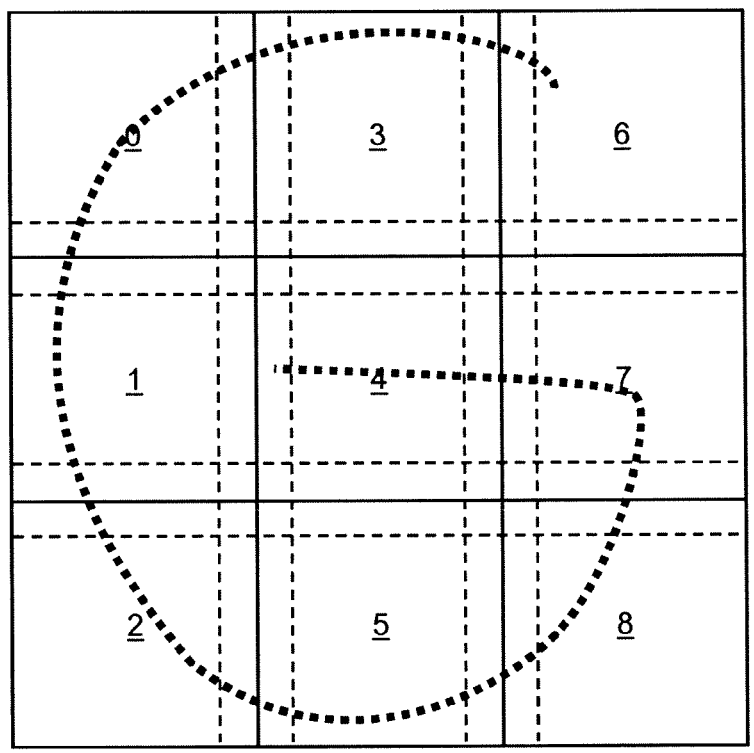
FIG. 12B shows a sample "G" optical flow plot, which is an example of a "G" marking pattern that is based on actuation-based subplots of the optical flow calculation, according to the present disclosure.

Referring to FIG. 12B, a sample "G" optical flow plot 1100 is presented, which is an example of a "G" marking pattern that is based on actuation-based subplots of the optical flow calculation of method 700 of FIG. 9 and scaled to fit a 3×3 grid, again the boxes are numbered 0 to 8.

Figure 12C:
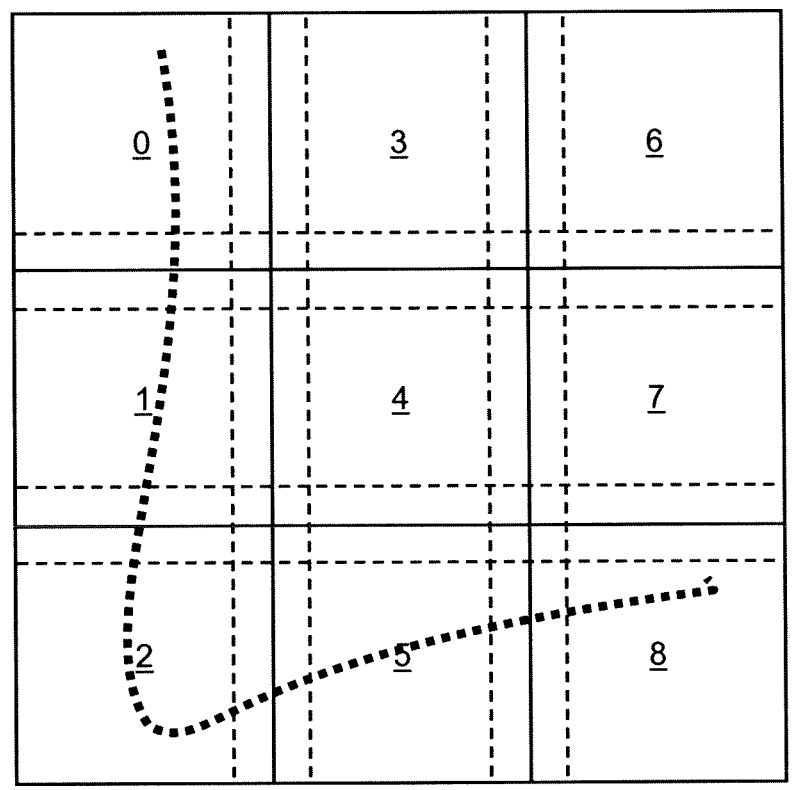
FIG. 12C shows a sample "L" optical flow plot, which is an example of a "L" marking pattern that is based on actuation-based subplots of the optical flow calculation, according to the present disclosure.

Referring to FIG. 12C, a sample "L" optical flow plot 1200 is presented, which is an example of a "L" marking pattern that is based on actuation-based subplots of the optical flow calculation of method 700 of FIG. 9 and scaled to fit a 3×3 grid, again the boxes are numbered 0 to 8.

At step 914, the marking pattern that is based on actuation-based subplots of the optical flow calculation is classified into which grid coordinates it falls and its grid coordinate string is determined. In one example and referring again to FIG. 12A, a sample grid coordinate string 1010 that correlates to sample "W" optical flow plot 1000 is shown. In this example, sample grid coordinate string 1010 is: (0)(01)(1)(12)(2)(12)(1)(14)(0134)(3)(34)(47)(4578)(8)(78)(7)(67)(6)(36).

In this example, each paren set indicates a region or possible group of regions (e.g., boxes 0 to 8) intersected by the sample "W" optical flow plot 1000. When a point of the plot falls near the edge of one or more regions, the numbers for the neighboring one or more regions are included. This may be done, for example, by increasing the size of a region by about 15%, which is indicated by the dotted lines in the grid of FIG. 12A.

In another example and referring again to FIG. 12B, a sample grid coordinate string 1110 that correlates to sample "G" optical flow plot 1100 is shown. In this example, sample grid coordinate string 1110 is: (6)(36)(3)(03)(0)(01)(1)(12)(2)(25)(5)(58)(8)(78)(7)(47)(4)(14). Again, each paren set indicates a region or possible group of regions (e.g., boxes 0 to 8) intersected by the sample "G" optical flow plot 1100.

In yet another example and referring again to FIG. 12C, a sample grid coordinate string 1210 that correlates to sample "L" optical flow plot 1200 is shown. In this example, sample grid coordinate string 1210 is: (0)(01)(1)(12)(2)(25)(5)(58)(8). Again, each paren set indicates a region or possible group of regions (e.g., boxes 0 to 8) intersected by the sample "L" optical flow plot 1200.

At step 916, the grid coordinate string of the current optical flow plot is compared to reference grid coordinate strings that are stored in local memory 132 and the initial marking pattern probability of matching is calculated. In one example, Levenshtein distance methods are utilized for performing this comparison. To illustrate, FIGS. 13A-C show examples of reference optical flow plots and respective reference grid coordinate strings that are stored in reference optical flow plots 162 at local memory 132.

Figure 13A:
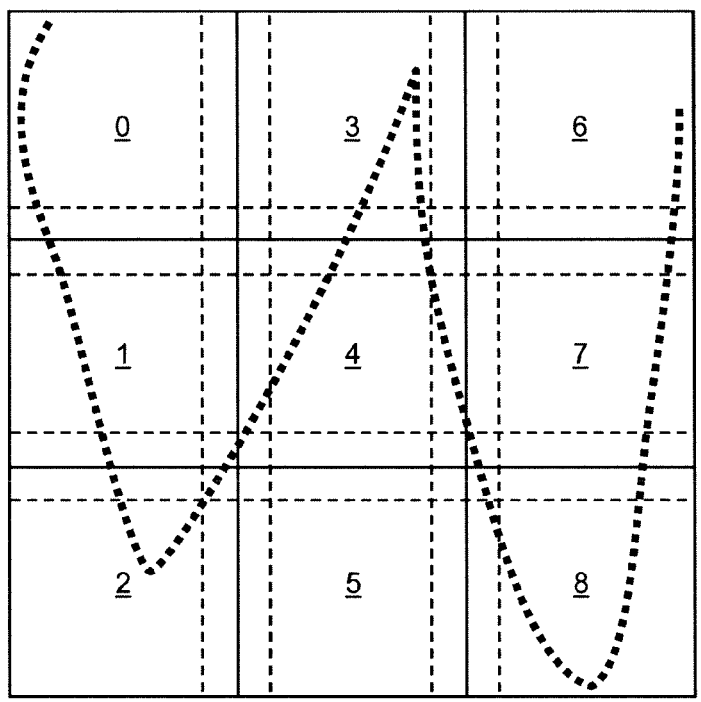
FIG. 13A shows an example of a reference "W" optical flow plot that is fitted to a 3×3 grid, according to some embodiments of the present disclosure.

Referring to FIG. 13A, a reference "W" optical flow plot 1300 that is fitted to a 3×3 grid and a corresponding reference grid coordinate string 1310 are presented. Reference "W" optical flow plot 1300 is an example of a reference optical flow plot 162 at local memory 132. In this example, reference grid coordinate string 1310 for reference "W" optical flow plot 1300 is: (0)(01)(1)(1245)(4)(45)(3)(34)(3467)(47)(4578)(58)(8)(78)(7)(67)(6).

Figure 13B:
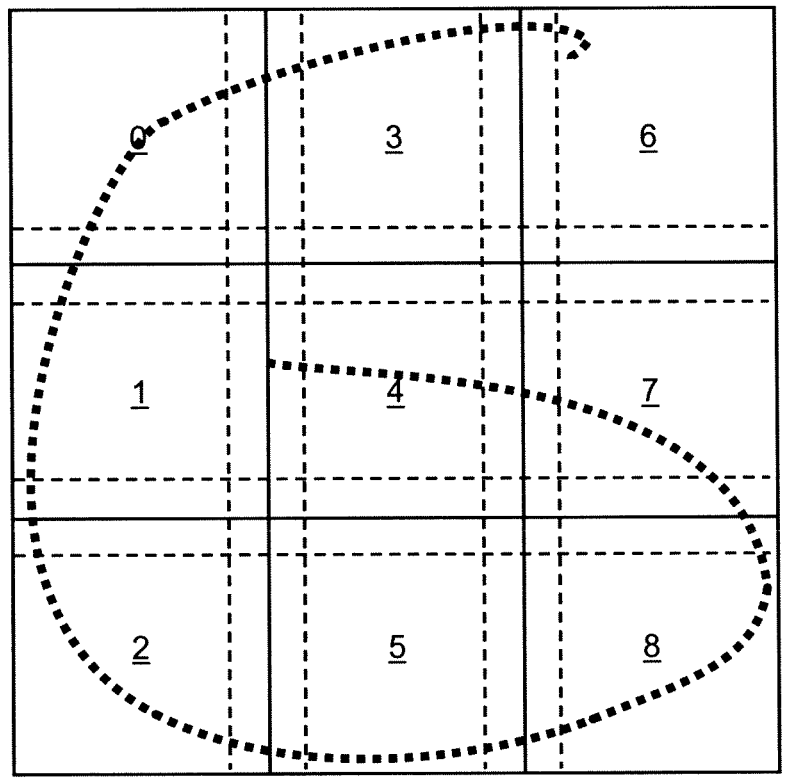
FIG. 13B shows an example of a reference "G" optical flow plot that is fitted to a 3×3 grid, according to some embodiments of the present disclosure.

Referring to FIG. 13B, a reference "G" optical flow plot 1400 that is fitted to a 3×3 grid and a corresponding reference grid coordinate string 1410 are presented. Reference "G" optical flow plot 1400 is another example of a reference optical flow plot 162 at local memory 132. In this example, reference grid coordinate string 1410 for reference "G" optical flow plot 1400 is: (6)(36)(3)(03)(0)(01)(1)(12)(2)(25)(5)(58)(8)(78)(7)(47)(4)(14).

Figure 13C:
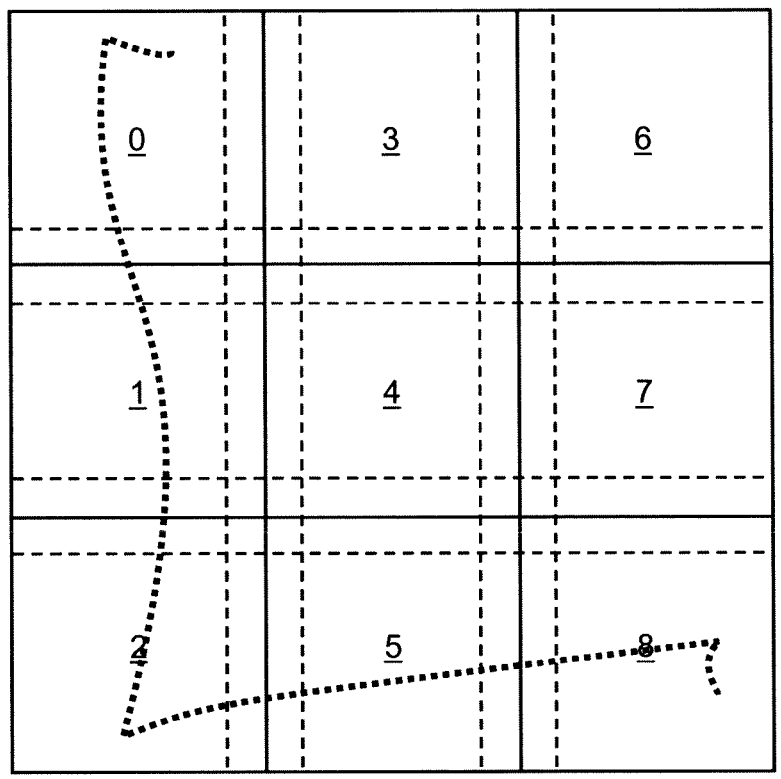
FIG. 13C shows an example of a reference "L" optical flow plot that is fitted to a 3×3 grid, according to some embodiments of the present disclosure.

Referring to FIG. 13C, a reference "L" optical flow plot 1500 that is fitted to a 3×3 grid and a corresponding reference grid coordinate string 1510 are presented. Reference "L" optical flow plot 1500 is yet another example of a reference optical flow plot 162 at local memory 132. In this example, reference grid coordinate string 1510 for reference "L" optical flow plot 1500 is: (0)(01)(1)(12)(2)(25)(5)(58)(8).

Referring to FIGS. 12A-C and 13A-C, the present disclosure is not limited to fitting a single character or symbol into the n×n grid, such as the 3×3 grid. FIGS. 12A-C and 13A-C are exemplary only. Any number and combinations characters and/or symbols may be fitted into the grid and processed. For example, the "ATT" marking pattern that is indicated in graphical optical flow output 500 of FIG. 8A, which is three characters, may be fitted to the n×n grid and a corresponding grid coordinate string assigned.

Continuing step 916, with respect to comparing the current optical flow plot to reference grid coordinate strings, in one example, if the current optical flow plot is sample "W" optical flow plot 1000 of FIG. 12A, pattern recognition algorithm 160 queries reference optical flow plots 162 and may determine that sample grid coordinate string 1010 of sample "W" optical flow plot 1000 matches reference grid coordinate string 1310 of reference "W" optical flow plot 1300 of FIG. 13A, with a certain probability.

In another example, if the current optical flow plot is sample "G" optical flow plot 1100 of FIG. 12B, pattern recognition algorithm 160 queries reference optical flow plots 162 and may determine that sample grid coordinate string 1110 of sample "G" optical flow plot 1100 matches reference grid coordinate string 1410 of reference "G" optical flow plot 1400 of FIG. 13B, with a certain probability.

In yet another example, if the current optical flow plot is sample "L" optical flow plot 1200 of FIG. 12C, pattern recognition algorithm 160 queries reference optical flow plots 162 and may determine that sample grid coordinate string 1210 of sample "L" optical flow plot 1200 matches reference grid coordinate string 1510 of reference "L" optical flow plot 1500 of FIG. 13C, with a certain probability.

Further, for the current optical flow, pattern recognition algorithm 160 may generate an initial probability of matching for more than one marking pattern. That is, at the end of this step there may be multiple possible matches with varying degrees of probability. This is especially true for alphanumeric characters that are similar. For example, the probability of matching of the current marking pattern may be: G=75% probability, C=75% probability, O=55% probability, Q=47% probability, D=29% probability, and the like. Other steps of method 900, which are to follow, may be used to further determine the best possible match (i.e., increase the probability of matching for a certain marking pattern).

At step 918, in order to further increase the probability of the current optical flow plot matching a certain marking pattern, pattern recognition algorithm 160 generates a motion metric by classifying the movement parameter of the optical flow calculation into one of, for example, eight directions. For example, pattern recognition algorithm 160 classifies the apparent motion of each frame of camera system data 140 into, for example, but not limited to, one of the following directions with respect to the FOV of the source camera system 112: north (N), northeast (NE), east (E), southeast (SE), south (S), southwest (SW), west (W), and northwest (NW).

In one example and referring again to graphical optical flow output 500 of FIG. 8A, the movement parameters for actuation-based subplots 516A, 516B, and 516C, which indicate the "A" of this "ATT" marking pattern, may be classified as follows. Each frame of camera system data 140 associated with actuation-based subplot 516A may be classified as NE. Each frame of camera system data 140 associated with actuation-based subplot 516B may be classified as SE. Each frame of camera system data 140 associated with actuation-based subplot 516C may be classified as W.

At step 920, for consecutive frames of camera system data 140, any consecutive movements in the same direction are coalesced and the lengths of the movements are summed together by pattern recognition algorithm 160. The lengths (or distances) of the apparent motion indicated in consecutive frames that are generally moving in the same direction are summed, thereby determining a length parameter.

In one example and referring again to graphical optical flow output 500 of FIG. 8A, the length parameters for actuation-based subplots 516A, 516B, and 516C, which indicate the "A" of this "ATT" marking pattern, may be determined as follows. If there are 32 frames of camera system data 140 associated with actuation-based subplot 516A and the length of movement of each frame is about 0.3 inches, then summing 0.3 inches 32 times means that the length of this segment is about 9.6 inches (i.e., length parameter=9.6 inches). If there are 40 frames of camera system data 140 associated with actuation-based subplot 516B and the length of movement of each frame is about 0.3 inches, then summing 0.3 inches 40 times means that the length of this segment is about 12 inches (i.e., length parameter=12 inches). If there are 15 frames of camera system data 140 associated with actuation-based subplot 516C and the length of movement of each frame is about 0.3 inches, then summing 0.3 inches 15 times means that the length of this segment is about 4.5 inches (i.e., length parameter=4.5 inches).

At step 922, using pattern recognition algorithm 160, the grid coordinate string information of steps 914 and 916, the movement parameters of step 918, and the length parameters of step 920 for the current optical flow plot are collected and associated one to another. This information may be compiled, for example, in pattern type data 164 at local memory 132.

At step 924, using color detection algorithm 166, the color of the marking material in the current frames of camera system data 140 is determined. For example, color detection algorithm 166 is used for analyzing the pixel values (i.e., RGB color, hue, and saturation data) in each frame of camera system data 140 in order to first determine whether freshly dispensed marking material is present in the image and, if yes, then determine the color of the freshly dispensed marking material. Once the color of the marking material is determined, color detection algorithm 166 may save the color information in color data 168 at local memory 132.

More specifically, in each frame of camera system data 140, color detection algorithm 166 determines any "paint" portion and any "no paint" portion of the image by analyzing the pixel value intensities. A predetermined intensity threshold that correlates to the intensity of freshly dispensed marking material is stored in local memory 132. The predetermined intensity threshold is color independent. Color detection algorithm 166 classifies all pixels having an intensity value below this intensity threshold as "no marking material," and then removes these pixels from the camera system data. Color detection algorithm 166 classifies all pixels having an intensity value at or above this intensity threshold as "marking material," and then saves only these pixels in the camera system data. In doing so, it is determined that there is fresh marking material present in the image.

Color detection algorithm 166 then analyzes these remaining pixels with respect to their specific color. For example, color detection algorithm 166 may generate an RGB histogram of the resulting image, which is an RGB histogram for the fresh marking material. The RGB histogram shows the distribution of RGB values. From the RGB histogram, color detection algorithm 166 determines the RGB value that has the highest occurrence (highest occurring RGB value) and, thereby, determines the color of the fresh marking material. A lookup table (not shown) may be used to match highest occurring RGB value to possible marking material colors.

Additionally, color detection algorithm 166 may query the color information of frames of camera system data 140 of previous actuations (i.e., historical color information) in order to confirm the color detected in the current frames of camera system data 140.

Continuing step 924, the color information of this step may be used to correlate the marking material color to the type of facility being marked, which is useful information for increasing the probability of a certain marking pattern. For example, RED=electric power, YELLOW=gas, ORANGE=communications, BLUE=water, GREEN=sewer, and so on. Therefore, if it is determined that the freshly dispensed marking material is yellow, which is gas, pattern recognition algorithm 160 may conclude that the current marking patterns are more likely to be marking patterns associated with gas and not as likely to be associated with electric power, communications, water, sewer, and so on.

At step 926, information from previous steps of method 900 is collected and a final marking pattern probability of matching is calculated and stored. For example, the grid coordinate string information of steps 914 and 916, the movement parameters of step 918, the length parameters of step 920, and the color information of step 924 may be processed by pattern recognition algorithm 160 to determine a final marking pattern probability of matching. Again, there may be a final marking pattern probability value for multiple types of marking patterns. One can assume that the marking pattern with the highest final marking pattern probability value is the marking pattern being dispensed for the current optical flow. Once the final marking pattern probability values are calculated, this information may be stored in pattern type data 164 at local memory 132.

Figure 14:
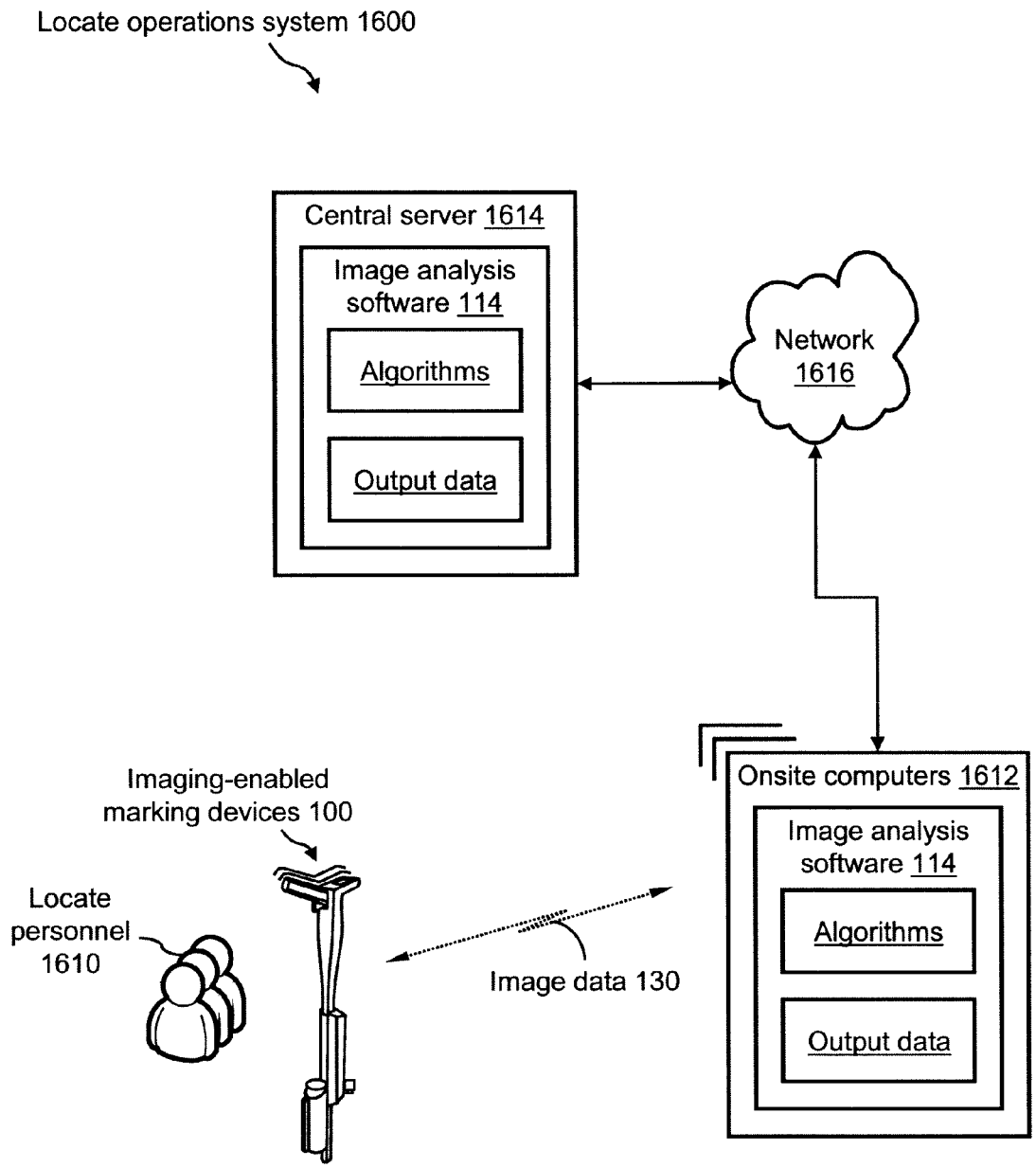
FIG. 14 shows a functional block diagram of an example of a locate operations system that includes a network of imaging-enabled marking devices, according to some embodiments of the present disclosure.

Referring to FIG. 14, a functional block diagram of an example of a locate operations system 1600 that includes a network of imaging-enabled marking devices 100 is presented. More specifically, locate operations system 1600 may include any number of imaging-enabled marking devices 100 that are operated by, for example, respective locate personnel 1610. An example of locate personnel 1610 is locate technicians. Associated with each locate personnel 1610 and/or imaging-enabled marking device 100 may an onsite computer 1612. Therefore, locate operations system 1600 may include any number of onsite computers 1612.

Each onsite computer 1612 may be any onsite computing device, such as, but not limited to, a computer that is present in the vehicle that is being used by locate personnel 1610 in the field. For example, onsite computer 1612 may be a portable computer, a personal computer, a laptop computer, a tablet device, a personal digital assistant (PDA), a cellular radiotelephone, a mobile computing device, a touch-screen device, a touchpad device, or generally any device including, or connected to, a processor. Each imaging-enabled marking device 100 may communicate via its communication interface 134 with its respective onsite computer 1612. More specifically, each imaging-enabled marking device 100 may transmit camera system data 140 to its respective onsite computer 1612.

While an instance of image analysis software 114 that includes the various algorithms and output data may reside and operate at each imaging-enabled marking device 100, an instance of image analysis software 114 may also reside at each onsite computer 1612. In this way, camera system data 140 may be processed at onsite computer 1612 rather than at imaging-enabled marking device 100. Additionally, onsite computer 1612 may process camera system data 140 concurrently to imaging-enabled marking device 100.

Additionally, locate operations system 1600 may include a central server 1614. Central server 1614 may be a centralized computer, such as a central server of, for example, the underground facility locate service provider. A network 1616 provides a communication network by which information may be exchanged between imaging-enabled marking devices 100, onsite computers 1612, and central server 1614. Network 1616 may be, for example, any local area network (LAN) and/or wide area network (WAN) for connecting to the Internet. Imaging-enabled marking devices 100, onsite computers 1612, and central server 1614 may be connected to network 1616 by any wired and/or wireless means.

While an instance of image analysis software 114 may reside and operate at each imaging-enabled marking device 100 and/or at each onsite computer 1612, an instance of image analysis software 114 may also reside at central server 1614. In this way, camera system data 140 may be processed at central server 1614 rather than at each imaging-enabled marking device 100 and/or at each onsite computer 1612. Additionally, central server 1614 may process camera system data 140 concurrently to imaging-enabled marking devices 100 and/or onsite computers 1612.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein the term "light" and related terms (e.g. "optical") are to be understood to include electromagnetic radiation both within and outside of the visible spectrum, including, for example, ultraviolet and infrared radiation.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
    A) dispensing marking material onto a target surface using a marking device to form at least one locate mark on the target surface;
    B) capturing camera system data relating to at least one image using at least one camera system attached to the marking device;
    C) analyzing the at least one image to determine tracking information indicative of a motion or an orientation of the marking device, wherein C) comprises:
        C1) obtaining an optical flow plot indicative of a path on the target surface traversed by the marking device; and D) analyzing the tracking information to determine marking information relating to the dispensed marking material, wherein the marking information relating to the dispensed marking material comprises attribute information indicative of an attribute of the at least one locate mark, and wherein the attribute comprises at least one of:
a presence of the at least one locate mark,
a pattern of the at least one locate mark,
a location of the at least one locate mark,
a quality of the at least one locate mark, and
a color of the at least one locate mark.

2. The method of claim 1, further comprising:
recording the marking information relating to the dispensed marking material.

3. The method of claim 1, wherein A) comprises:
A1) actuating a trigger associated with the marking device to dispense the marking material;
A2) obtaining timestamp information indicative of at least one period of time during which the trigger is actuated to dispense the marking material; and
A3) using the timestamp information and the optical flow plot obtained in C) to identify marked portions of the path.

4. The method of claim 1, wherein C) further comprises:
C2) analyzing at least a portion of the optical flow plot to determine the attribute information indicative of the attribute of the at least one locate mark.

5. The method of claim 4, wherein C2) comprises:
applying at least one pattern recognition algorithm to the optical flow plot.

6. The method of claim 4, wherein C2) comprises:
C2a) comparing at least a portion of the optical flow plot to at least one reference plot to determine the attribute information indicative of the attribute of the at least one locate mark.

7. The method of claim 6, wherein C2a) comprises:
scaling the optical flow plot and the reference plot to a common reference grid comprising a plurality of regions;
determining a first set of regions of the grid traversed by the optical flow plot;
determining a second set of regions of the grid traversed by the reference plot; and
comparing the first and second sets of regions.

8. The method of claim 7, wherein C2a) further comprises:
determining first information indicative of an order in which the optical flow plot traversed the first set of regions;
determining second information indicative of an order in which the reference plot traversed the second set of regions; and
comparing the first and second order information.

9. The method of claim 6, wherein C2a) further comprises:
C2a1) identifying one or more portions of the optical flow plot that substantially corresponds to a marking pattern;
C2a2) generating at least one subplot from the optical flow plot containing at least one of the portions of the optical flow identified in C2a1); and
C2a3) comparing the at least one subplot generated in C2a2) with at least one reference plot to determine the attribute information.

10. The method of claim 9, further comprising:
C2a4) prior to C2a3), processing the at least one subplot to facilitate C2a3).

11. The method of claim 10, wherein C2a4) comprises at least one of:
scaling the at least one subplot;
rotating the at least one subplot; and
applying a grid to the at least one subplot.

12. The method of claim 1, further comprising:
E) obtaining, using at least one device, supplemental tracking information indicative of at least one of a location, a motion, and an orientation of the marking device.

13. The method of claim 12, wherein the at least one device comprises at least one of:
a global positioning system device, a triangulation device, an inertial measurement unit, an accelerometer, a gyroscope, a sonar range finder, a laser range finder, and an electronic compass.

14. The method of claim 12, further comprising recording the supplemental tracking information.

15. The method of claim 12, wherein D) comprises:
analyzing the tracking information and at least some of the supplemental tracking information to determine the marking information.

16. The method of claim 1, further comprising locating at least one facility buried under the target surface.

17. A marking apparatus for dispensing marking material onto a target surface, the marking apparatus comprising:
at least one camera system attached to the marking apparatus; and
control electronics communicatively coupled to the at least one camera system and comprising a processing unit configured to:
receive camera system data generated by the at least one camera system;
analyze the camera system data to determine tracking information indicative of the motion or orientation of the marking apparatus; and
analyze the tracking information to determine marking information relating to the marking material dispensed by the marking apparatus.

18. The apparatus of claim 17, further comprising:
at least one memory communicatively coupled to the processing unit, wherein the memory is configured to record the marking information.

19. The apparatus of claim 18, wherein the marking information comprises attribute information indicative of an attribute of at least one locate mark on the target surface.

20. The apparatus of claim 19, wherein the attribute comprises at least one of:
a presence of the at least one locate mark, a pattern of the at least one locate mark,
a location of the at least one locate mark,
a quality of the at least one locate mark, and
a color of the at least one locate mark.

21. The apparatus of claim 19, wherein the tracking information comprises an optical flow plot indicative of a path on the target surface traversed by the marking device.

22. The apparatus of claim 21, comprising a triggering system comprising:
a trigger associated with the marking apparatus;
an actuation mechanism configured to dispense the marking material from a marker container when the trigger is actuated; and
a signal generator to send a trigger signal to the control electronics indicative of an actuation of the trigger.

23. The apparatus of claim 22, wherein the processing unit is configured to:
in response to the trigger signal, obtain timestamp information indicative of periods of time during which the trigger is actuated to dispense marker material; and
identify marked portions of the path based on the timestamp information and the optical flow plot.

24. The apparatus of claim 21, wherein the processing unit is configured to analyze at least a portion of the optical flow plot to determine information indicative of an attribute of the at least one locate mark.

25. The apparatus of claim 21, wherein the processing unit is configured to apply at least one pattern recognition algorithm to the optical flow plot.

26. The apparatus of claim 21, wherein the processing unit is configured to compare at least a portion of the optical flow plot to at least one reference plot to determine information indicative of an attribute of the at least one locate mark.

27. The apparatus of claim 17, further comprising:
at least one input device in communication with the control electronics, wherein the at least one input device is configured to generate supplemental tracking information indicative of at least one of the location, the motion, and the orientation of the marking apparatus.

28. The apparatus of claim 27, wherein the at least one input device comprises at least one of:
a global positioning system device, a global navigation satellite system device, a ground-based triangulation device, an inertial measurement unit, an accelerometer, a gyroscope, a sonar range finder, a laser range finder and an electronic compass.

29. The apparatus of claim 27, wherein:
the processing unit is configured to:
receive the supplemental tracking information; and
analyze the tracking information and at least some of the supplemental tracking information to determine the marking information.

30. An apparatus for tracking a motion and/or an orientation of a marking device used to dispense a marking material onto a target surface, the apparatus comprising:
at least one communication interface;
at least one memory to store processor-executable instructions; and
at least one processor communicatively coupled to the at least one memory and the at least one communication interface, wherein, upon execution of the processor-executable instructions, the at least one processor:
A) analyzes at least one image of the target surface being marked to obtain an optical flow plot indicative of a path on the target surface traversed by the marking device, the at least one image being captured by at least one camera system attached to the marking device;
B) retrieves, from the at least one memory, a plurality of reference plots, respectively representing a plurality of reference marking patterns; and
C) compares at least one portion of the optical flow plot to at least some of the plurality of reference plots retrieved in B) to identify at least one reference marking pattern of the plurality of reference marking patterns that substantially matches the at least one portion of the optical flow plot obtained in A).

31. The apparatus of claim 30, wherein the apparatus is located remote from the marking device, and wherein the processor controls the at least one communication interface so as to receive the at least one image from the at least one camera system.

32. The apparatus of claim 30, further comprising a wireless communication link between the processor and the at least one camera system.

33. The apparatus of claim 30, further comprising the marking device, wherein the marking device comprises a triggering system comprising:
a trigger;
a marking container;
an actuation mechanism to dispense the marking material from the marking container when the trigger is actuated; and
a signal generator in communication with the processing unit to send a trigger signal to the processor indicative of the actuation of the trigger.

34. The apparatus of claim 33, further comprising a wireless communication link between the signal generator and the at least one camera system.

35. The apparatus of claim 33, wherein the memory and the processor are attached to or integral with the marking device.

36. The apparatus of claim 33, further comprising the at least one camera system, wherein the at least one camera system is attached to the marking device.

37. The apparatus of claim 30, further comprising the marking device.

38. A computer program product comprising a non-transitory computer readable medium having a computer readable program code embodied therein, the computer readable program code adapted to be executed to implement a method comprising:
A) receiving camera system data from at least one camera system attached to a marking device dispensing a marking material onto a target surface;
B) analyzing the camera system data to determine tracking information indicative of a motion or an orientation of the marking device; and
C) analyzing the tracking information to determine marking information relating to the dispensed marking material.

39. A computer-implemented method for tracking a motion and/or an orientation of a marking device used to dispense a marking material onto a target surface, the method comprising:
A) displaying at least one image of the target surface being marked on a display device;
B) analyzing, in the computer, the at least one image to obtain an optical flow plot indicative of a path on the target surface traversed by the marking device, the at least one image being captured by at least one camera system attached to the marking device;
B) comparing, in the computer, at least one portion of the optical flow plot to at least some of a plurality of reference plots respectively representing a plurality of reference marking patterns to identify at least one reference marking pattern of the plurality of reference marking patterns that substantially matches the at least one portion of the optical flow plot obtained in A).

40. A computer program product comprising a non-transitory computer readable medium having a computer readable program code embodied therein, the computer readable program code adapted to be executed to implement a method for tracking a motion and/or an orientation of a marking device used to dispense a marking material onto a target surface, the method comprising:
A) analyzing at least one image of the target surface being marked to obtain an optical flow plot indicative of a path on the target surface traversed by the marking device, the at least one image being captured by at least one camera system attached to the marking device; and B) comparing at least one portion of the optical flow plot to at least some of a plurality of reference plots respectively representing a plurality of reference marking patterns to identify at least one reference marking pattern of the plurality of reference marking patterns that substantially matches the at least one portion of the optical flow plot obtained in A).

* * * * *